US012627589B2

(12) United States Patent
Clark

(10) Patent No.: US 12,627,589 B2
(45) Date of Patent: May 12, 2026

(54) NETWORK COLLECTIVE OFFLOADING COST MANAGEMENT

(71) Applicant: Advanced Micro Devices, Inc., Santa Clara, CA (US)

(72) Inventor: Josiah I. Clark, Austin, TX (US)

(73) Assignee: Advanced Micro Devices, Inc., Santa Clara, CA (US)

( * ) Notice: Subject to any disclaimer, the term of this patent is extended or adjusted under 35 U.S.C. 154(b) by 48 days.

(21) Appl. No.: 18/540,783

(22) Filed: Dec. 14, 2023

(65) Prior Publication Data

US 2024/0205093 A1      Jun. 20, 2024

Related U.S. Application Data

(60) Provisional application No. 63/432,657, filed on Dec. 14, 2022.

(51) Int. Cl.
| | |
|---|---|
| *G06F 15/177* | (2006.01) |
| *H04L 41/0823* | (2022.01) |
| *H04L 41/12* | (2022.01) |
| *H04L 45/00* | (2022.01) |
| *H04L 45/02* | (2022.01) |
| *H04L 49/00* | (2022.01) |

(52) U.S. Cl.
CPC .......... *H04L 45/02* (2013.01); *H04L 41/0823* (2013.01); *H04L 41/12* (2013.01); *H04L 45/34* (2013.01); *H04L 49/30* (2013.01)

(58) Field of Classification Search
CPC ..... H04L 45/02; H04L 45/34; H04L 41/0823; H04L 41/12; H04L 49/30
See application file for complete search history.

(56) References Cited

U.S. PATENT DOCUMENTS

| | | |
|---|---|---|
| 2005/0169179 A1 | 8/2005 | Antal et al. |
| 2014/0059556 A1 | 2/2014 | Barsness et al. |
| 2014/0279883 A1 | 9/2014 | Kostenko |
| 2018/0268296 A1 | 9/2018 | Zheng et al. |
| 2019/0042527 A1 | 2/2019 | Langer |
| 2019/0340263 A1 | 11/2019 | Porat-Stoler et al. |
| 2021/0392047 A1* | 12/2021 | Jamkhedkar ........ H04L 41/0894 |
| 2022/0100752 A1 | 3/2022 | Rastogi |
| 2022/0200906 A1 | 6/2022 | Ye et al. |

(Continued)

FOREIGN PATENT DOCUMENTS

| | | |
|---|---|---|
| CN | 111898730 A | 11/2020 |
| JP | 2018207182 A | 12/2018 |

OTHER PUBLICATIONS

International Search Report and Written Opinion dated Apr. 2, 2024, from International Application No. PCT/US2023/084145; (10 pages), by Yang, Jeong Rok.

(Continued)

*Primary Examiner* — Joseph R Maniwang
(74) *Attorney, Agent, or Firm* — Greenberg Traurig, LLP

(57) ABSTRACT

The disclosed device includes a collective engine that can select a communication cost model from multiple communication cost models for a collective operation and configure a topology of a collective network for performing the collective operation using the selected communication cost model. Various other methods, systems, and computer-readable media are also disclosed.

19 Claims, 20 Drawing Sheets

Method 1000

Start

Evaluate a plurality of communication cost models for a collective operation
1002

Determine values for a plurality of cost model parameters based on the evaluation
1004

Configure, using a plurality of topology parameters corresponding to the values for the plurality of cost model parameters, a topology of a collective network for performing the collective operation
1006

End

(56)                    References Cited

U.S. PATENT DOCUMENTS

2022/0366220 A1    11/2022  Roth et al.
2022/0393698 A1    12/2022  Sethi et al.

OTHER PUBLICATIONS

International Search Report and Written Opinion, dated Apr. 8, 2024, from International Application No. PCT/US2023/084146; (10 pages), by Yang, Jeong Rok.
International Search Report and Written Opinion, dated Mar. 27, 2024, from corresponding International Application No. PCT/US2023/084144 (10 pages).

* cited by examiner

100

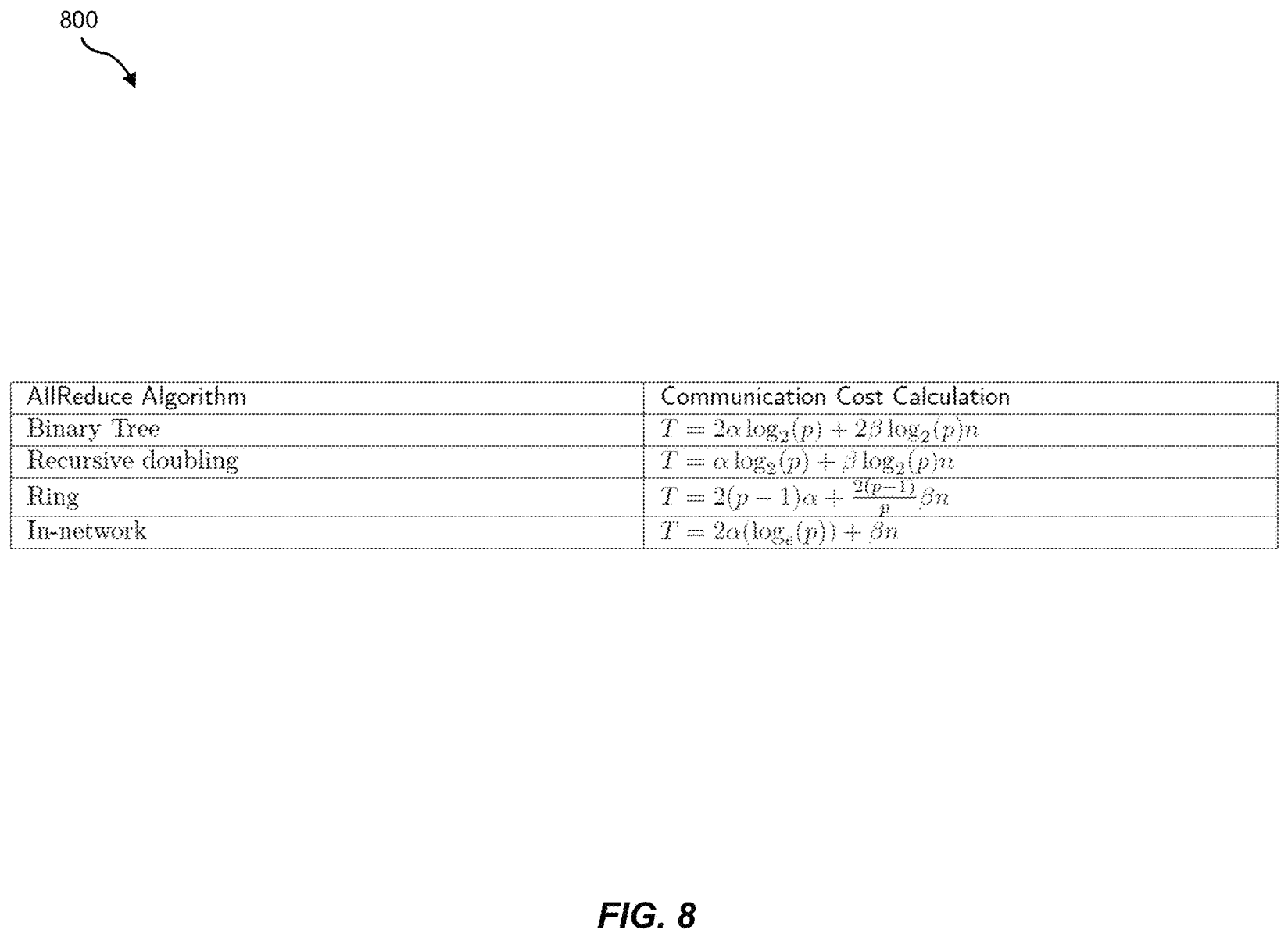

800

| AllReduce Algorithm | Communication Cost Calculation |
|---|---|
| Binary Tree | $T = 2\alpha \log_2(p) + 2\beta \log_2(p)n$ |
| Recursive doubling | $T = \alpha \log_2(p) + \beta \log_2(p)n$ |
| Ring | $T = 2(p-1)\alpha + \frac{2(p-1)}{p}\beta n$ |
| In-network | $T = 2\alpha(\log_k(p)) + \beta n$ |

*FIG. 8*

Time6: Layer 0 Nodes Sends Chunks Deeper into Network (if Required Depending on Nodes in Job)

Method
1000

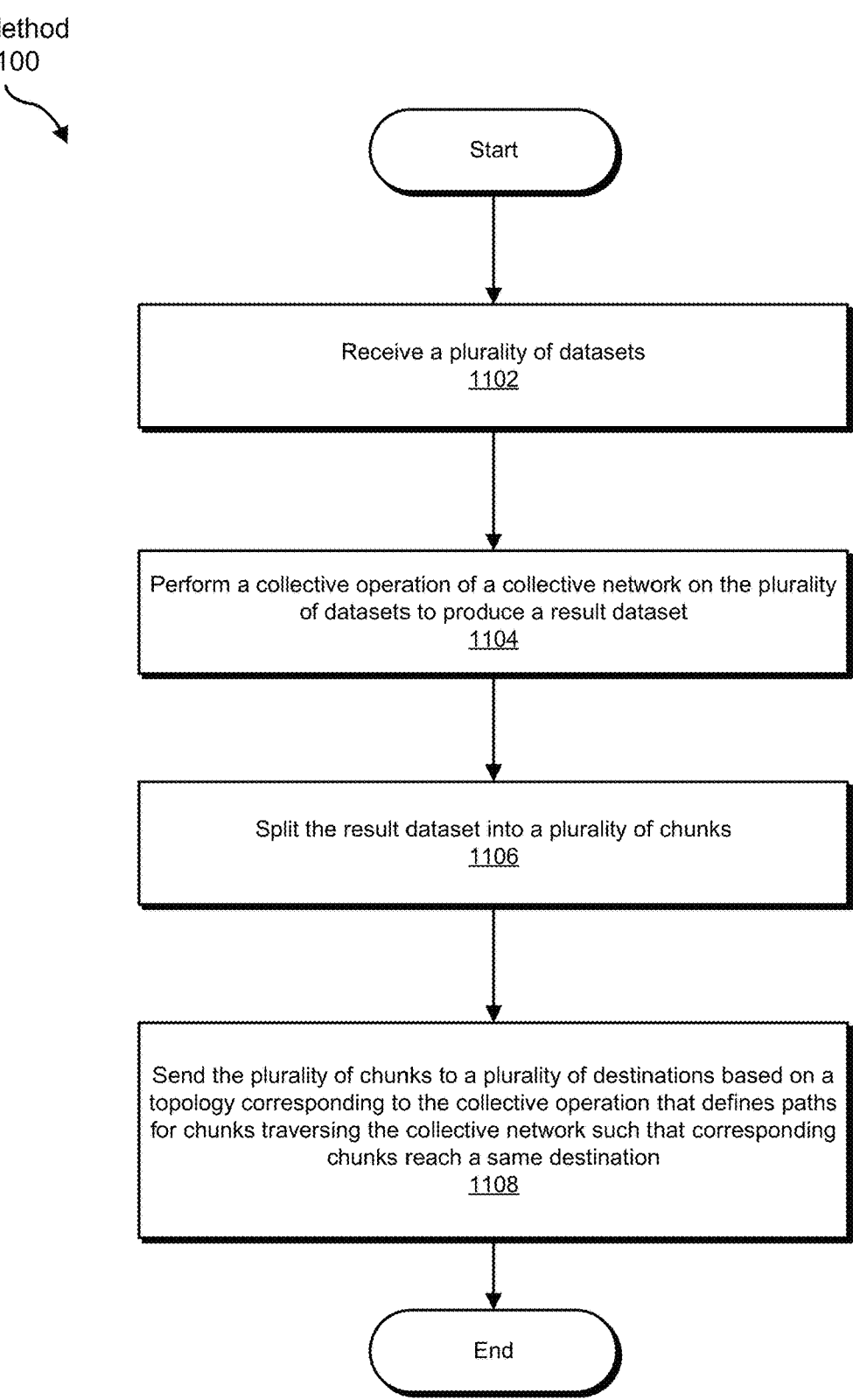

Method
1100

Start

Receive a plurality of datasets
1102

Perform a collective operation of a collective network on the plurality
of datasets to produce a result dataset
1104

Split the result dataset into a plurality of chunks
1106

Send the plurality of chunks to a plurality of destinations based on a
topology corresponding to the collective operation that defines paths
for chunks traversing the collective network such that corresponding
chunks reach a same destination
1108

End

*FIG. 11*

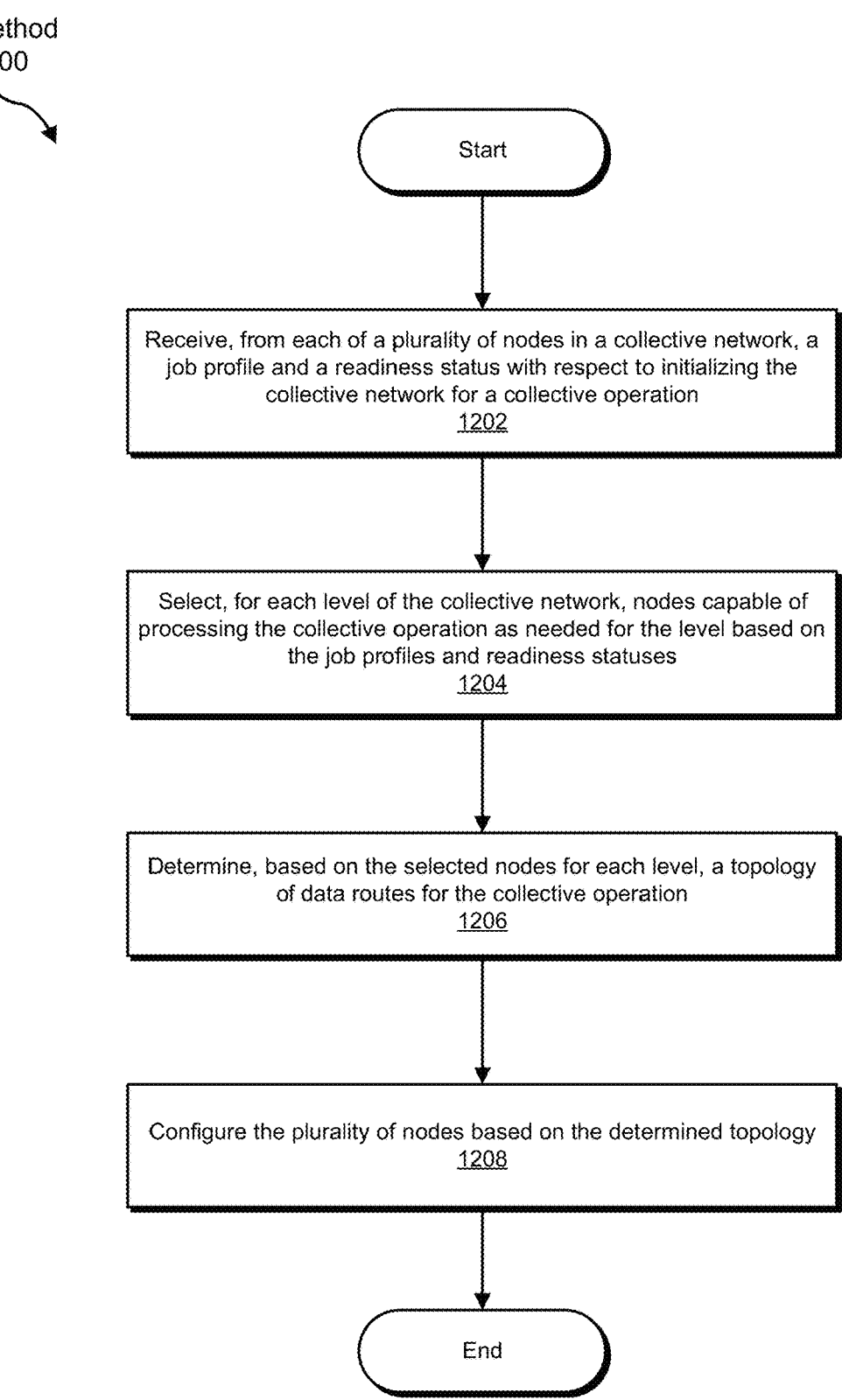

Method
1200

Start

Receive, from each of a plurality of nodes in a collective network, a job profile and a readiness status with respect to initializing the collective network for a collective operation
1202

Select, for each level of the collective network, nodes capable of processing the collective operation as needed for the level based on the job profiles and readiness statuses
1204

Determine, based on the selected nodes for each level, a topology of data routes for the collective operation
1206

Configure the plurality of nodes based on the determined topology
1208

End

*FIG. 12*

NETWORK COLLECTIVE OFFLOADING COST MANAGEMENT

CROSS REFERENCE TO RELATED APPLICATION

This application claims the benefit of U.S. Provisional Application No. 63/432,657, filed 14 Dec. 2022, the disclosure of which is incorporated, in its entirety, by this reference.

BACKGROUND

Various improvements to computing performance, such as increasing a number of processing cores, provide increased performance but can reach scalability limits. Collective communications allow for global communications operations amongst all processes/nodes in a system (e.g., a collective network), including networked nodes. As a number of nodes increase, collective communications can suffer from scalability issues. To ensure better scalability, certain communications processing can be offloaded from the nodes (e.g., processors thereof) to other nodes (e.g., a network adapter, switch, etc.) of the collective network, which can be managed by a collective engine that can reside in a server or other connected computing device.

BRIEF DESCRIPTION OF THE DRAWINGS

The accompanying drawings illustrate a number of exemplary implementations and are a part of the specification. Together with the following description, these drawings demonstrate and explain various principles of the present disclosure.

FIG. 8 is a table of network topology cost models for an allreduce operation.

FIGS. 9A-G illustrate a network topology as chunks are routed through.

FIG. 11 is a flow diagram of an exemplary method for network collective offload routing management.

FIG. 12 is a flow diagram of an exemplary method for network collective offload message chunking management.

Figure 1:
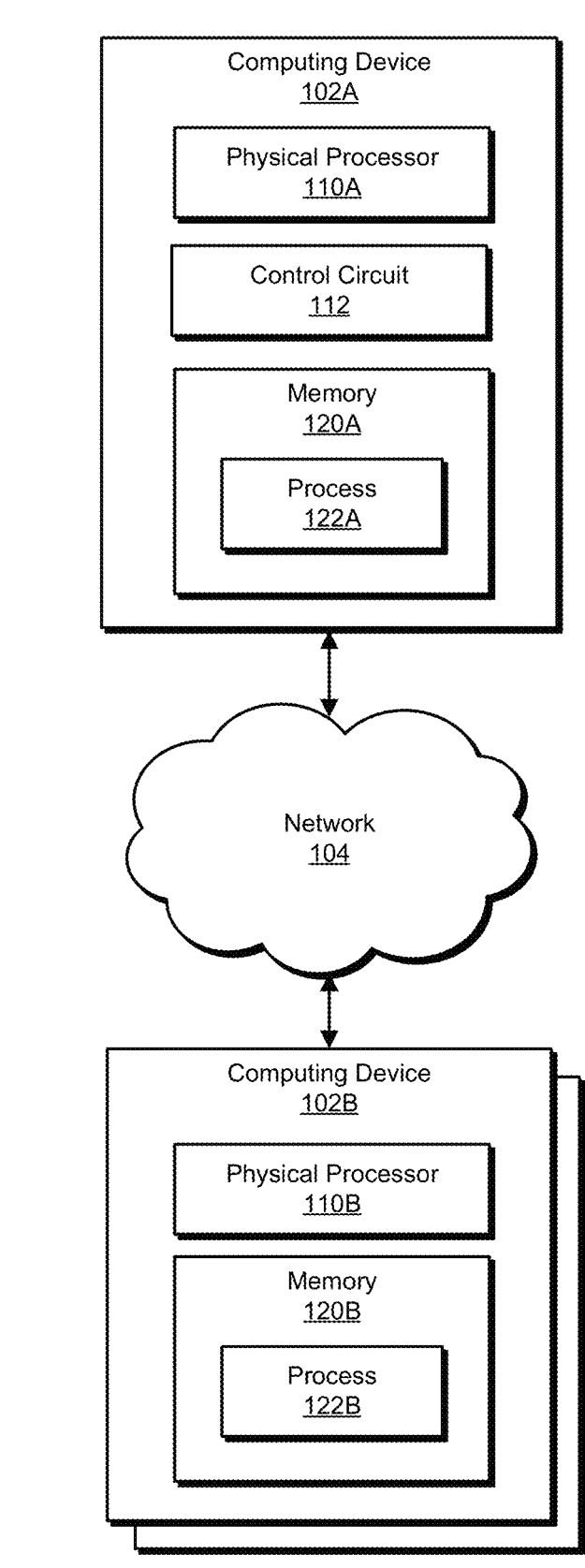
FIG. 1 is a block diagram of an exemplary system for a collective engine.

Throughout the drawings, identical reference characters and descriptions indicate similar, but not necessarily identical, elements. While the exemplary implementations described herein are susceptible to various modifications and alternative forms, specific implementations have been shown by way of example in the drawings and will be described in detail herein. However, the exemplary implementations described herein are not intended to be limited to the particular forms disclosed. Rather, the present disclosure covers all modifications, equivalents, and alternatives falling within the scope of the appended claims.

DETAILED DESCRIPTION

The present disclosure is generally directed to network collective offloading management. As will be explained in greater detail below, implementations of the present disclosure provide a collective engine that can manage various aspects of collective offloading onto networked nodes that communicate with each other to share data and/or processing of data.

The present disclosure is generally directed to network collective offloading cost management. As will be explained in greater detail below, implementations of the present disclosure configure a topology of a collective network for performing a collective operation based on a communication cost model, which can be evaluated and/or otherwise optimized for communication cost (e.g., latency with respect to sending data), such as reducing and/or minimizing costs for communicating between nodes of the collective network when performing the collective operation. The systems and methods provided herein can improve efficiency of the collective network, for instance by establish a more efficient topology that reduces network communication costs.

In one implementation, a device for network collective offloading cost management includes a control circuit configured to select a communication cost model for a collective operation, and configure, based on the selected communication cost model, a topology of a collective network for performing the collective operation.

In some examples, the control circuit is configured to select the communication cost model by optimizing a communication cost of the collective operation by evaluating a plurality of communication cost models for the collective operation, and selecting the cost model from the plurality of communication cost models corresponding to the optimized communication cost. In some examples, the communication cost model includes a plurality of parameters and optimizing the communication cost includes determining optimized parameters for the plurality of parameters. In some examples, configuring the topology is based on using the optimized parameters as topology parameters.

In some examples, the plurality of parameters includes at least one of a number of upstream ports, a number of downstream ports, a number of processors, a number of ports per processor, a tree depth, and a stride value. In some examples, configuring the topology includes configuring communication connections between nodes of a level of the collective network with nodes of neighboring levels of the collective network based at least on an optimized stride value that corresponds to a number of nodes connected to in a next level.

In some examples, optimizing the communication cost includes flattening a tree associated with the cost model. In some examples, the control circuit is configured to configured a portion of the topology based on the selected communication cost model. In some examples, the control circuit is configured to configure a second portion of the topology based on a second communication cost model.

In one implementation, a system for network collective offloading cost management includes a memory, a processor, and a control circuit configured to evaluate cost parameters of a communication cost model for a collective operation, and configure, based on the cost parameters, a topology of a collective network for performing the collective operation.

In some examples, the control circuit is configured to evaluate the cost parameters of the communication cost model by optimizing a communication cost of the collective operation. In some examples, optimizing the communication cost includes determining optimized parameter values for the cost parameters, and configuring the topology is based on using the optimized parameter values as topology parameters. In some examples, the cost parameters include at least one of a number of upstream ports, a number of downstream ports, a number of processors, a number of ports per processor, a tree depth, and a stride value.

In some examples, configuring the topology includes configuring communication connections between nodes of a level of the collective network with nodes of neighboring levels of the collective network based at least on an optimized stride value that corresponds to a number of nodes connected to in a next level. In some examples, optimizing the communication cost includes flattening a tree associated with the cost model.

In some examples, the control circuit is further configured to configure a portion of the topology based on the evaluated communication cost model and configuring a second portion of the topology based on a second communication cost model.

In one implementation, a method for network collective offload cost management includes (i) evaluating a plurality of communication cost models for a collective operation, (ii) determining values for a plurality of cost model parameters based on the evaluation, and (iii) configuring, using a plurality of topology parameters corresponding to the values for the plurality of cost model parameters, a topology of a collective network for performing the collective operation.

In some examples, evaluating the plurality of communication cost models include optimizing a communication cost of the collective operation and the values for the plurality of cost model parameters are determined based on the optimized communication cost. In some examples, configuring the topology includes configuring communication connections between nodes of a level of the collective network with nodes of neighboring levels of the collective network based on the plurality of topology parameters. In some examples, the method includes configuring a portion of the topology based on the plurality of topology parameters and configuring a second portion of the topology based on a second communication cost model.

Features from any of the implementations described herein can be used in combination with one another in accordance with the general principles described herein. These and other implementations, features, and advantages will be more fully understood upon reading the following detailed description in conjunction with the accompanying drawings and claims.

The following will provide, with reference to FIGS. 1-10, detailed descriptions of network collective offload management. Detailed descriptions of example systems and networks for collective operations will be provided in connection with FIGS. 1 and 2. Example diagrams of collective operations will be provided in connection with FIGS. 3, 4, 5, and 6. Example diagrams of collective network routing for an allreduce operation will be provided in connection with FIGS. 7A-7C. Example costs associated with collective network node routing for the allreduce operation will be provided in connection with FIG. 8. Example data routing incorporating message chunking and deadlock prevention for the allreduce operation will be provided in connection with FIGS. 9A-9G. Detailed descriptions of corresponding computer-implemented methods will also be provided in connection with FIGS. 10, 11, and 12.

FIG. 1 illustrates an exemplary collective network 100 (e.g., an interconnect network) implementing aspects of the present disclosure. Collective network 100 includes a computing device 102A, a network 104, and a computing device 102B. Computing device 102A and/or computing device 102B can each be a network device, such as a network switch, router, etc., and/or a client device or user device, such as a desktop computer, laptop computer, tablet device, smartphone, or other computing device such as a server, and/or parts thereof. Computing device 102A includes a physical processor 110A and computing device 102B includes a physical processor 110B. Physical processor 110A and/or physical processor 110B can correspond to one or more instances of any type or form of hardware-implemented processing unit capable of interpreting and/or executing computer-readable instructions including, without limitation, chiplets (e.g., smaller and in some examples more specialized processing units that can coordinate as a single chip), microprocessors, microcontrollers, Central Processing Units (CPUs), graphics processing units (GPUs), Field-Programmable Gate Arrays (FPGAs) that implement softcore processors, Application-Specific Integrated Circuits (ASICs), systems on chip (SoCs), co-processors such as digital signal processors (DSPs), Neural Network Engines (NNEs), accelerators, graphics processing units (GPUs), portions of one or more of the same, variations or combinations of one or more of the same, and/or any other suitable physical processor. In some implementations, a physical processor referred to herein (e.g., physical processor 110A and/or physical processor 110B) can correspond to a host processor along with a co-processor, which is some examples can be separate processors.

In some examples, processor 110A and/or processor 110B accesses and/or modifies data and/or instructions stored in memory 120A and/or memory 120B. Memory 120A and/or memory 120B each correspond to instance of any type or form of volatile or non-volatile storage device or medium capable of storing data and/or computer-readable instructions, including, without limitation, Random Access Memory (RAM), Read Only Memory (ROM), flash memory, Hard Disk Drives (HDDs), Solid-State Drives (SSDs), optical disk drives, caches, variations, or combinations of one or more of the same, and/or any other suitable storage memory. In some implementations, memory 120A and/or memory 120B can correspond to internal memory of processor 110A and/or processor 110B, respectively.

In certain implementations, memory 120A can store one or more processes such as a process 122A and memory 120B can store one or more processes such as a process 122B. Process 122A and/or process 122B can represent one or more software applications, programs, and/or processes that, when executed by a computing device, causes the computing device to perform one or more tasks, such as portions of collective operations described herein. For example, and as will be described in greater detail below, one or more of process 122A and/or process 122B can represent instructions (e.g., corresponding to collective operations and/or portions thereof) stored and configured to run on one or more computing devices, such as the devices illustrated in FIG. 1 (e.g., computing device 102A and/or computing device 102B). In some examples, each process (e.g., instances of process 122A and/or process 122B) can correspond to localized versions of collective operations (e.g., instructions for a node to perform its portion of the collective operations).

Computing device 102A is communicatively coupled to computing device 102B through network 104. Network 104 represents any type or form of communication network, such as the Internet, and can comprise one or more physical connections, such as LAN, and/or wireless connections, such as WAN.

As further illustrated in FIG. 1, computing device 102A includes a control circuit 112. In some implementations, control circuit 112 corresponds to and/or is an implementation of a collective engine for offloading collective communications (e.g., collective operations) from nodes (e.g., locally from one or more physical processor 110A and/or process 122A, and/or remotely from one or more computing device 102B as well as one or more physical processor 110B and/or process 122B) in a collective system corresponding to collective network 100. Although FIG. 1 illustrates computing device 102A and computing device 102B, in other examples, collective network 100 can include additional computing devices which computing device 102A can manage in collective operations. Moreover, in some implementations, one or more instances of computing device 102A and/or computing device 102B can correspond to devices (e.g., CPU, GPU, network interface card (NIC), etc.) that are part of a larger computing device.

Control circuit 112 can correspond to circuitry and/or instructions for managing collective communications/operations of nodes such as components of computing device 102A and/or computing device 102B and other instances thereof. In some examples, a node can correspond to an application (e.g., software that can use/process data involved in collective operations as can be represented by process 122A and/or process 122B) and/or a device (e.g., a computing or networking device such as processors, network interfaces, switches, etc. that can locally perform portions of collective operations by receiving, processing as needed, and forwarding data to appropriate nodes and/or a shared memory device or device containing addressable memory that in some examples is not able to process data on its own) and/or portions of a device (e.g., different processing components/circuits within a device). In some implementations, control circuit 112 can coordinate or otherwise manage which nodes perform which collective operations and/or portions thereof (e.g., coordinating which nodes perform which instructions as needed for the collective operations). In some implementations, control circuit 112 can further manage network topology and/or other routing aspects of the collective network.

The collective engine (e.g., control circuit 112) can establish a network topology for a collective network, which in some examples refers to a connection pattern of nodes in an interconnect network and often represented by a graph. A node or vertex, in some examples, refer to a machine (e.g., a server, a switch, and/or a router which can in some implementations correspond to computing device 102A and/or computing device 102B) or a device (e.g., a central processing unit (CPU) and/or cores thereof, a graphics processing unit (GPU) and/or cores thereof, a network interface or network interface card (NIC), a switch, etc., which can in some implementations correspond to computing device 102A and/or computing device 102B and/or parts thereof) in the network topology, which can have various physical and/or virtual ports (e.g., corresponding to interfaces for wired and/or wireless communication) for communicating with other nodes in the collective network. A server, in some examples, refers to a machine containing devices such as processors and network interface cards. A switch, in some examples, refers to a machine or device that can receive packets from any number of input ports and transmits the packets to any number of output ports, which in some examples can further be capable of processing data. A router, in some examples, refers to a machine or device capable of forwarding packets between networks (e.g., via physical ports). A network interface, in some examples, refers to a device used by a machine to connect to a network and further capable of forwarding packets. An edge, in some examples, refers to a connection between one or more vertices/nodes. In an interconnect network, a single edge can include multiple links, and each link can have multiple channels. At the roots of the topology, multiple processes can run concurrently (e.g., by machines/devices).

Figure 2:
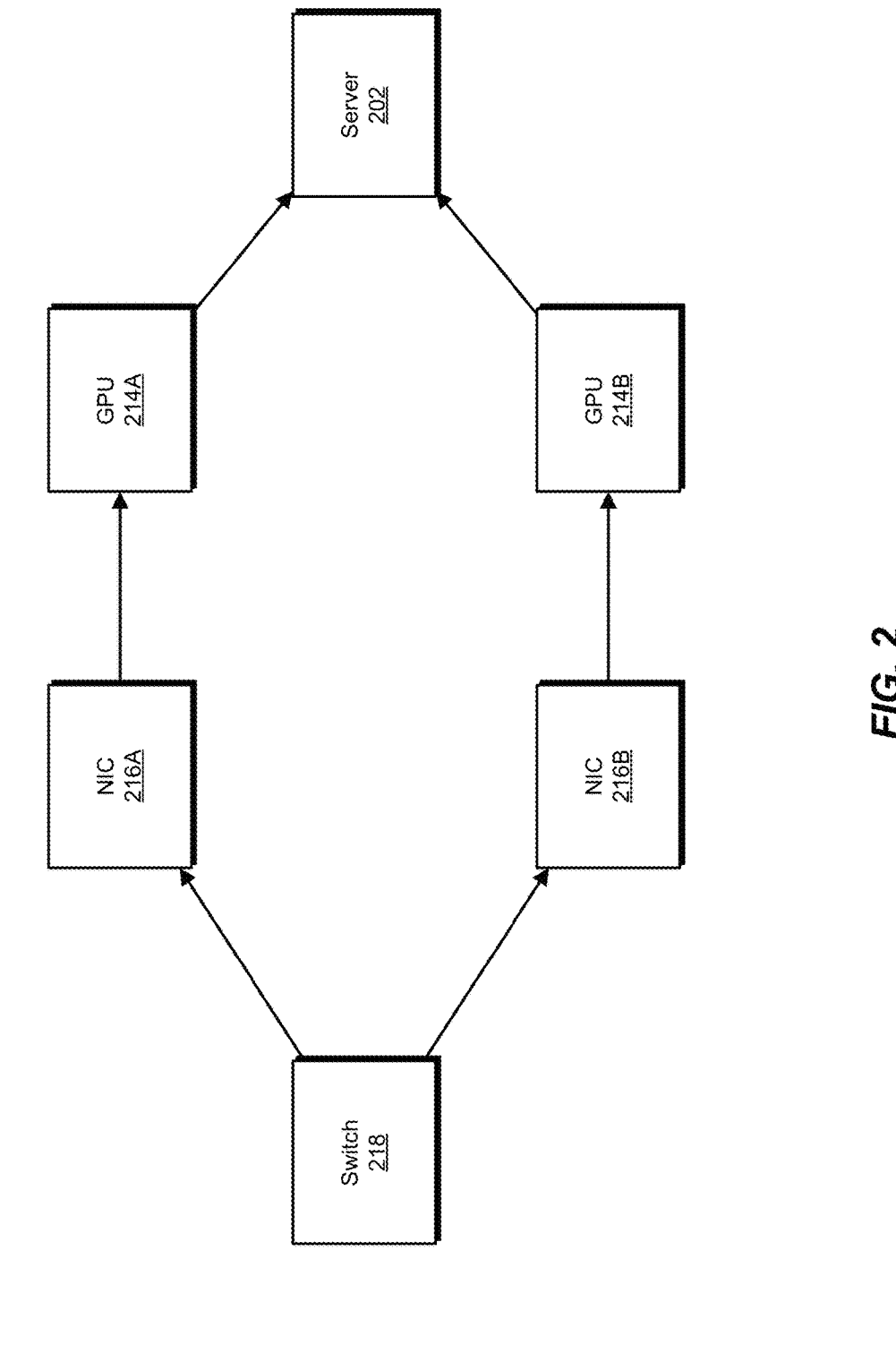
FIG. 2 is block diagram of an exemplary collective network.

FIG. 2 illustrates a system 200, corresponding to collective network 100, of a simplified example collective network. System 200 includes a server 202 (corresponding to an instance of computing device 102A and/or computing device 102B), a GPU 214A (corresponding to an instance of computing device 102A and/or computing device 102B), a GPU 214B (corresponding to an instance of computing device 102A and/or computing device 102B), a NIC 216A (corresponding to an instance of computing device 102A and/or computing device 102B), a NIC 216B (corresponding to an instance of computing device 102A and/or computing device 102B), and a switch 218 (corresponding to an instance of computing device 102A and/or computing device 102B). The collective engine (e.g., control circuit 112) can establish a topology (e.g., a ring in FIG. 2) for nodes (e.g., server 202, GPU 214A, GPU 214B, NIC 216A, NIC 216B, and switch 218) by establishing directional links (which can be bi-directional in some examples) between nodes. In other words, the collective engine can establish which nodes communicate with which other nodes.

The collective engine can further help coordinate processes running on the various nodes in performing collective communication operations that represent distributed operations (e.g., as instructions) performed on data. Examples of collective operations include broadcast, reduce (-to-one), scatter, gather, allgather, reduce-scatter, and allreduce, as will be described further below.

Figure 3:
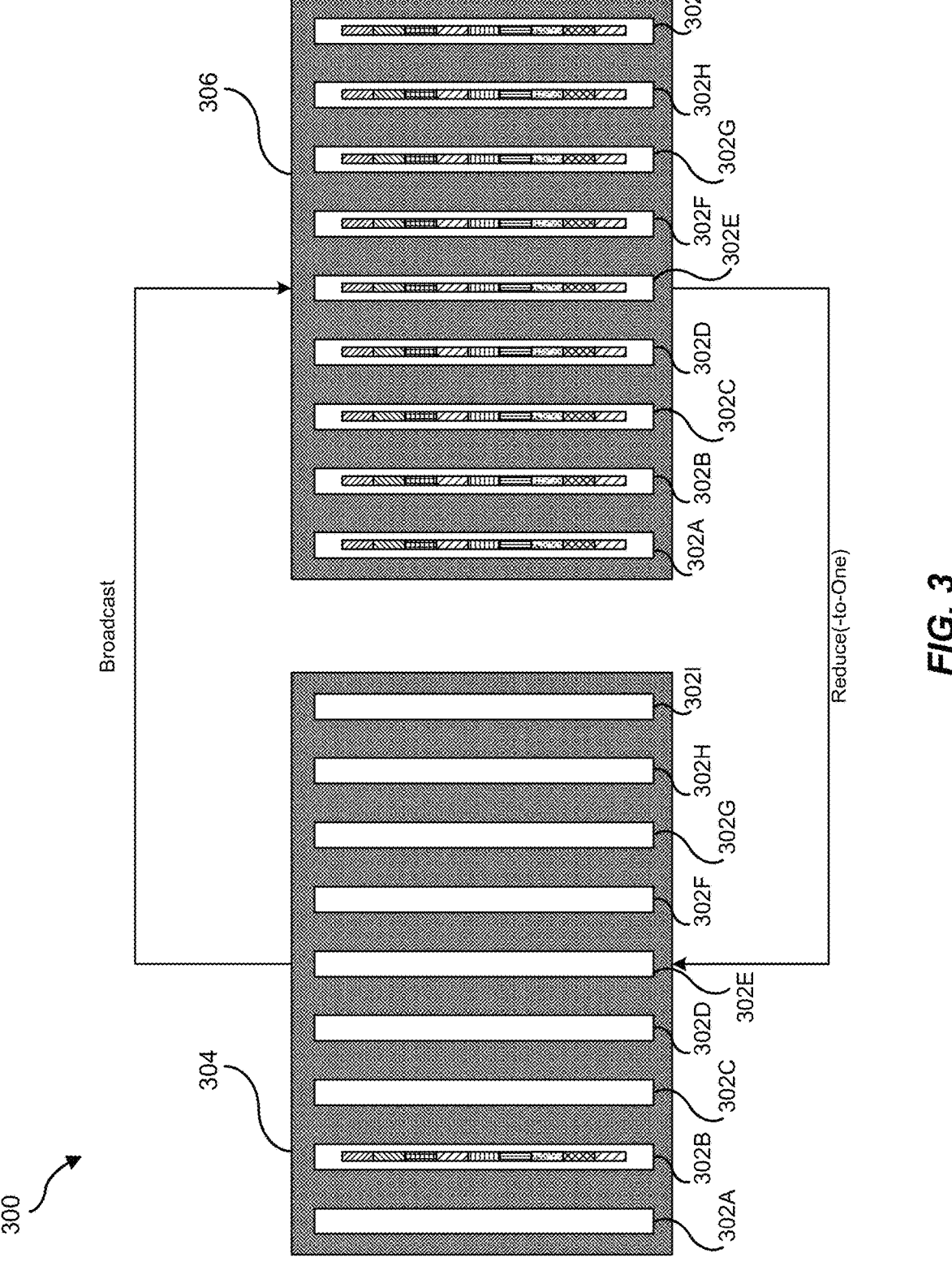
FIG. 3 is a simplified diagram of a broadcast operation and a reduce operation.

FIG. 3 illustrates a collective operation 300 corresponding to broadcast operation and/or a reduce operation for a process 302A, a process 302B, a process 302C, a process 302D, a process 302E, a process 302F, a process 302G, a process 302H, and a process 302I for a phase 304 and a phase 306. Each of processes 302A-302I can correspond to a process (e.g., one or more iterations of process 122A and/or process 122B) running on one or more nodes (e.g., one or more iterations of computing device 102A and/or computing device 102B respectively) in an interconnect network (e.g., collective network 100).

In a broadcast operation, data belonging to one process (e.g., process 302B) is sent to all processes (e.g., process 302A, process 302C, process 302D, process 302E, process 302F, process 302G, process 302H, process 302I). More specifically, the broadcast operation can start with phase 304, during which process 302B has a set of data, which can be a full vector or message, although in other examples can correspond to a one or more data elements. As a result of the broadcast operation, at phase 306, the set of data (e.g., the same vector) is broadcast to all other processes such that all processes 302A-302I have the same set of data. FIG. 3 illustrates each index of the data vector with a different pattern.

In a reduce (-to-one) operation, data (e.g., the full vector/message which can be common to all processes) belonging to all processes (e.g., processes 302A-302I) can be reduced to a single set/vector and sent to a single process (e.g., process 302B). More specifically, as illustrated in FIG. 3, the reduce operation can start with phase 306, during which data held by processes 302A-I can be reduced to a single vector and sent to a single target process at phase 304. In some examples, a reduce can be an inverse of a broadcast, as illustrated in FIG. 3.

Figure 4:
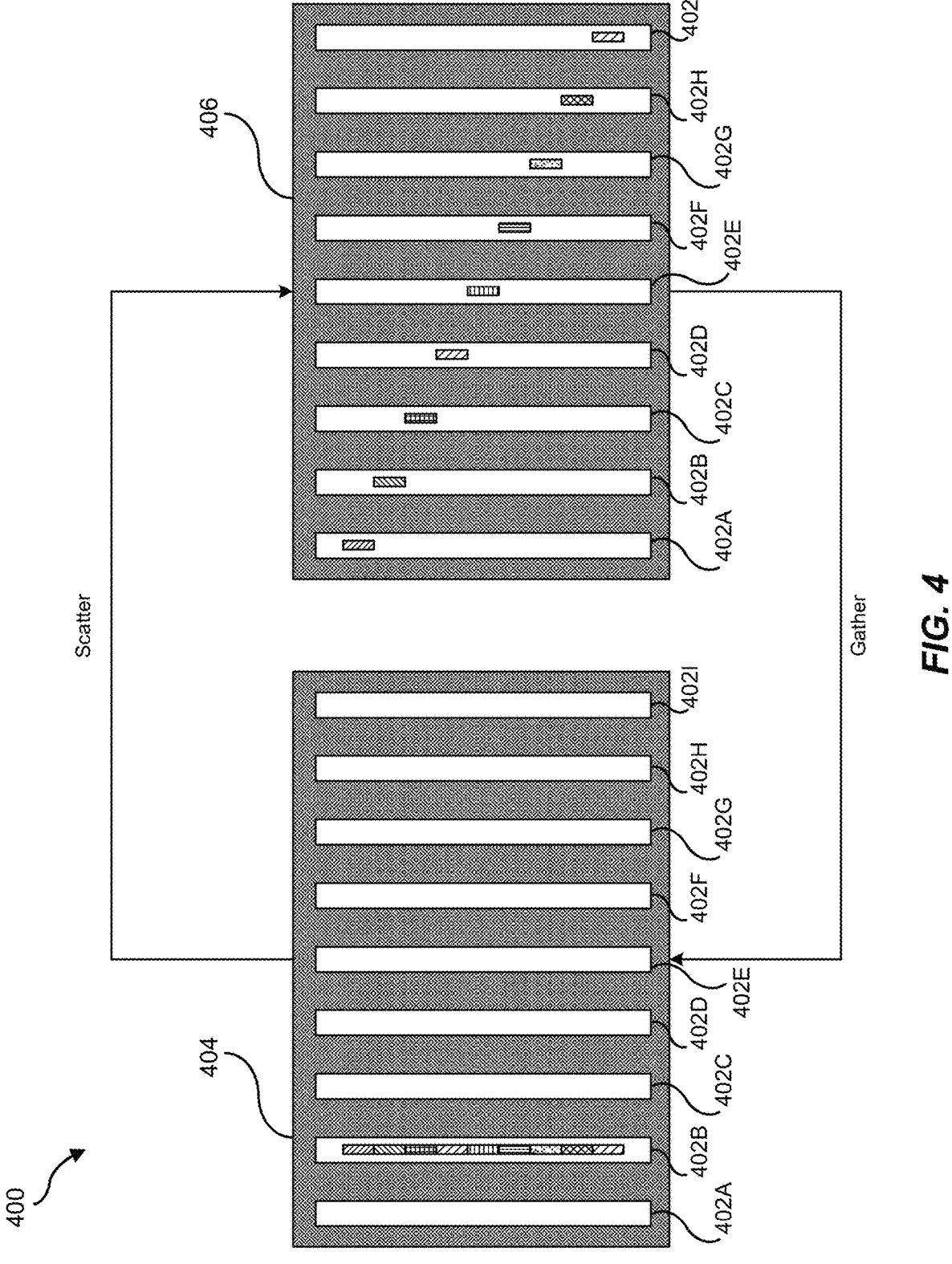
FIG. 4 is a simplified diagram of a scatter operation and a gather operation.

FIG. 4 illustrates a collective operation 400 corresponding to a scatter operation and a gather operation for a process 402A, a process 402B, a process 402C, a process 402D, a process 402E, a process 402F, a process 402G, a process 402H, and a process 402I for a phase 404 and a phase 406. Each of processes 402A-402I can correspond to a process (e.g., one or more iterations of process 122A and/or process 122B) running on one or more nodes (e.g., one or more iterations of computing device 102A and/or computing device 102B respectively) in an interconnect network (e.g., collective network 100).

In a scatter operation, data (e.g., a full vector) belonging to one process (e.g., process 402B at phase 404) is parsed out (e.g., by index) to all processes (e.g., processes 402A-402I at phase 406). More specifically, as illustrated in FIG. 4, each process can be indexed such that at phase 406, each of processes 402A-402I receives data of a corresponding index, such as a first process (e.g., process 402A) receiving a first data element of the vector, a second process (e.g., process 402B) receiving a second data element of the vector, and so forth. FIG. 4 illustrates each index of the data vector with a different pattern.

In a gather operation, data belonging to all processes (e.g., processes 402A-402I at phase 406) is collected into a single vector and sent to a single process (e.g., process 402B at phase 404). More specifically, as illustrated in FIG. 4, at phase 406 each process has a data element that can be collected and arranged in a vector of data elements in order of process, such that the data element from the first process (e.g., process 402A) provides the first data element of the vector, the data element from the second process (e.g., process 402B) provides the second data element of the vector, and so forth. The collected vector can be sent to a target process (e.g., process 402B at phase 404). In some examples, a gather can be an inverse of a scatter, as illustrated in FIG. 4.

Figure 5:
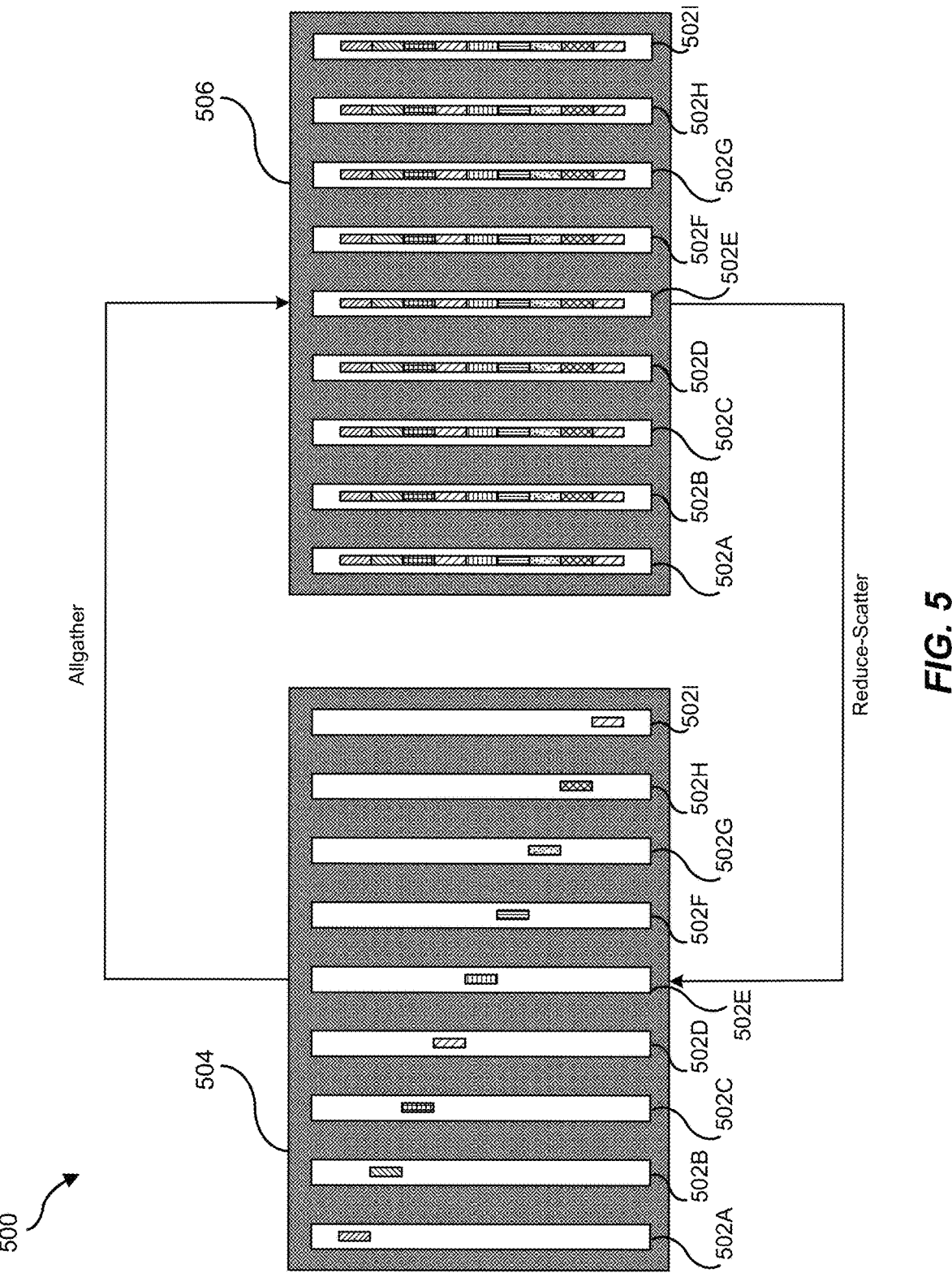
FIG. 5 is a simplified diagram of an allgather operation and a reduce-scatter operation.

FIG. 5 illustrates a collective operation 500 corresponding to an allgather operation and a reduce-scatter operation for a process 502A, a process 502B, a process 502C, a process 502D, a process 502E, a process 502F, a process 502G, a process 502H, and a process 502I for a phase 504 and a phase 506. Each of processes 502A-502I can correspond to a process (e.g., one or more iterations of process 122A and/or process 122B) running on one or more nodes (e.g., one or more iterations of computing device 102A and/or computing device 102B respectively) in an interconnect network (e.g., collective network 100).

In an allgather operation, data belonging to all processes (e.g., processes 502A-502I at phase 504) is collected (e.g., based on index) and sent to all processes (e.g., processes 502A-502I at phase 506). More specifically, as illustrated in FIG. 5, each of processes 502A-502I at phase 504 has a data element that can be collected and arranged in a vector of data elements in order of process, such that the data element from the first process (e.g., process 502A) provides the first data element of the vector, the data element from the second process (e.g., process 502B) provides the second data element of the vector, and so forth. The collected vector of data can be sent to each of processes 502A-502I at phase 506. FIG. 5 illustrates each index of the data vector with a different pattern.

In a reduce-scatter operation, data (which can be common to all processes) belonging to all processes (e.g., processes 502A-502I at phase 506) is parsed out (e.g., based on vector index) to all processes (e.g., processes 502A-502I at phase 504). More specifically, as illustrated in FIG. 5, the first data element of the common vector can be sent to the first process (e.g., process 502A at phase 504), the second data element can be sent to the second process (e.g., process 502B), and so forth. In some examples, a reduce-scatter operation can be an inverse of an allgather operation, as illustrated in FIG. 5.

Figure 6:
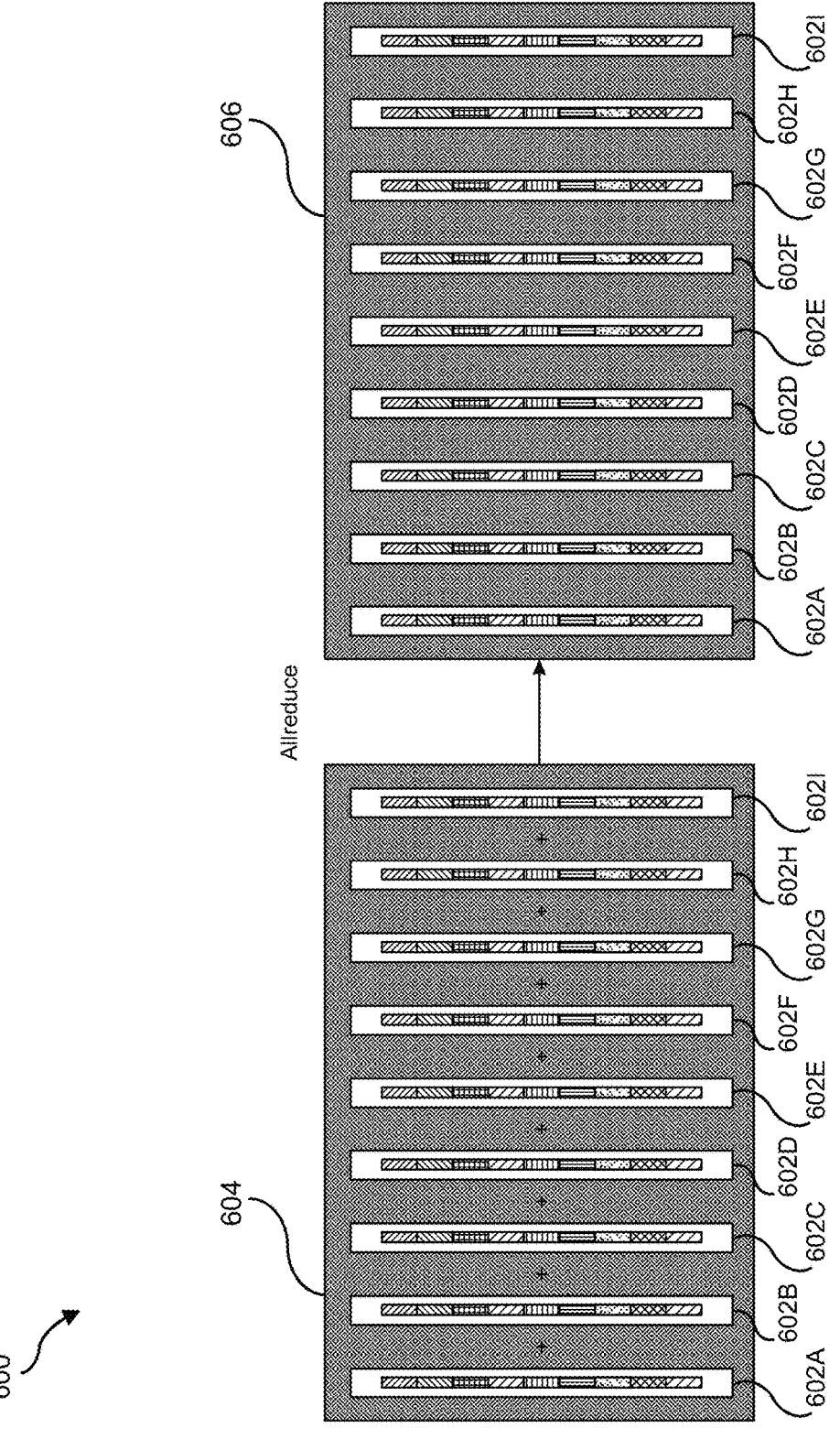
FIG. 6 is a simplified diagram of an allreduce operation.

FIG. 6 illustrates a collective operation 600 corresponding to an allreduce operation for a process 602A, a process 602B, a process 602C, a process 602D, a process 602E, a process 602F, a process 602G, a process 602H, and a process 602I for a phase 604 and a phase 606. Each of processes 602A-602I can correspond to a process (e.g., one or more iterations of process 122A and/or process 122B) running on one or more nodes (e.g., one or more iterations of computing device 102A and/or computing device 102B respectively) in an interconnect network (e.g., collective network 100).

In an allreduce operation, data belonging to all processes (e.g., processes 602A-602B at phase 604) is collected and operated on (e.g., reduced) and the results can be sent to all processes (e.g., processes 602A-602I at phase 606). The data can be reduced by index such that the reduction is performed on values of corresponding indices for each process (e.g., the first data element across all processes being reduced, the second data element across all processes being reduced, and so forth). FIG. 6 illustrates each index of the data vector with a different pattern.

The resulting vector includes the reductions for each index. Examples of reduction operations include maximum (e.g., selecting a maximum value), minimum (e.g., selecting a minimum value), sum (e.g., adding together all values), product (e.g., multiplying together all values), logical and (e.g., Boolean), bitwise and (e.g., performing and operations bit-by-bit), logical or, bitwise or, logical exclusive or, bitwise exclusive or, maximum and location of maximum, and minimum and location of minimum. Accordingly, at phase 606, all processes 602A-602I can have the same vector having reductions for each index.

Although FIGS. 3-6 illustrate source and destination processes to illustrate beginning and ending phases of the operations, data can travel in different routes based on the operation such that the various processes can be interconnected in different ways for different operations. In some implementations, an allreduce operation requires interleaving nodes, such as switches, to perform operations. In contrast, a broadcast operation, for example, requires interleaving nodes to forward data but does not require operating on the data. Accordingly, a network topology for performing an allreduce operation can impact a performance of the allreduce operation as compared to a broadcast operation.

Figure 7A:
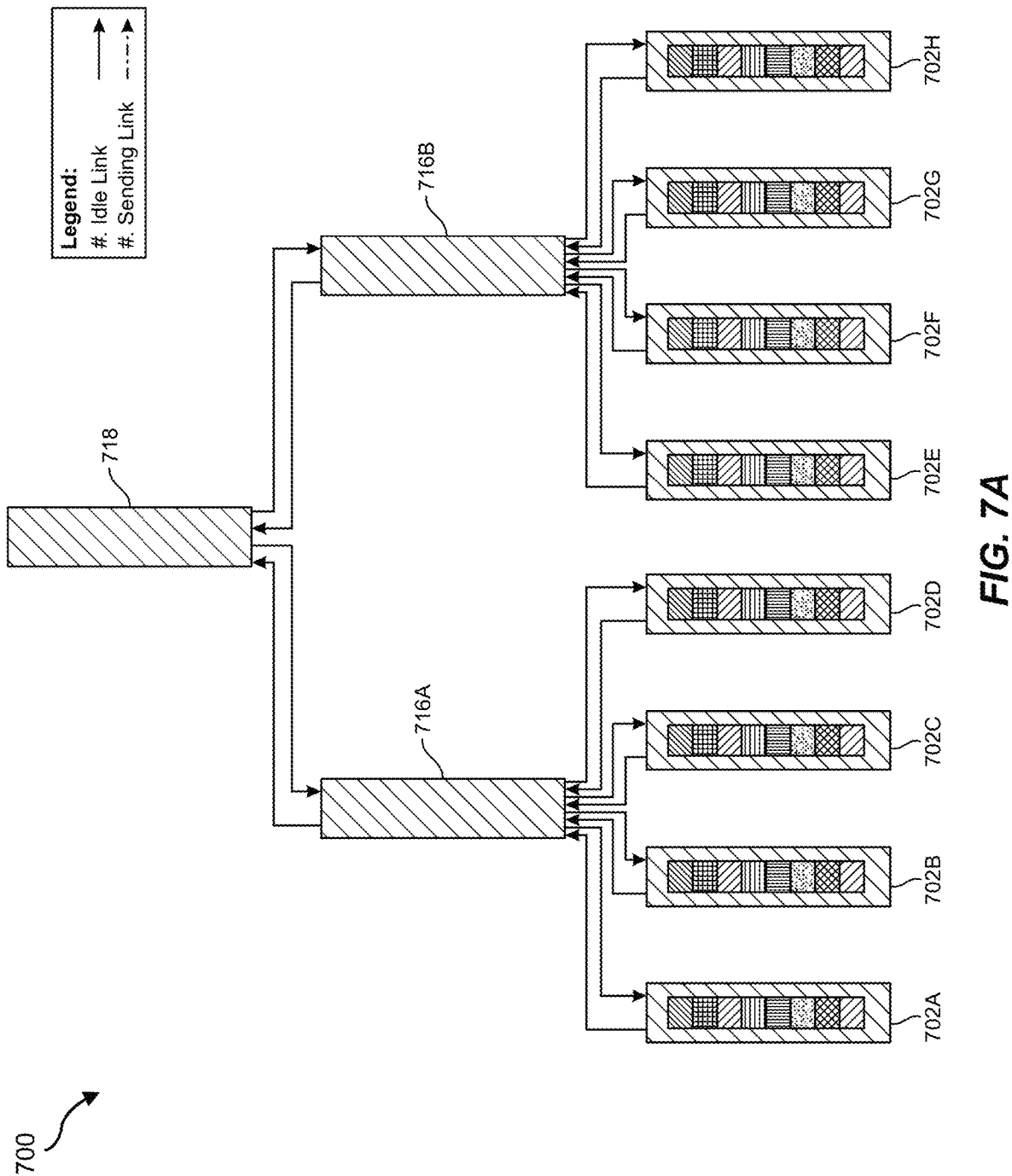
FIG. 7A is a network topology diagram of an initial phase of an allreduce operation.
Figure 7B:
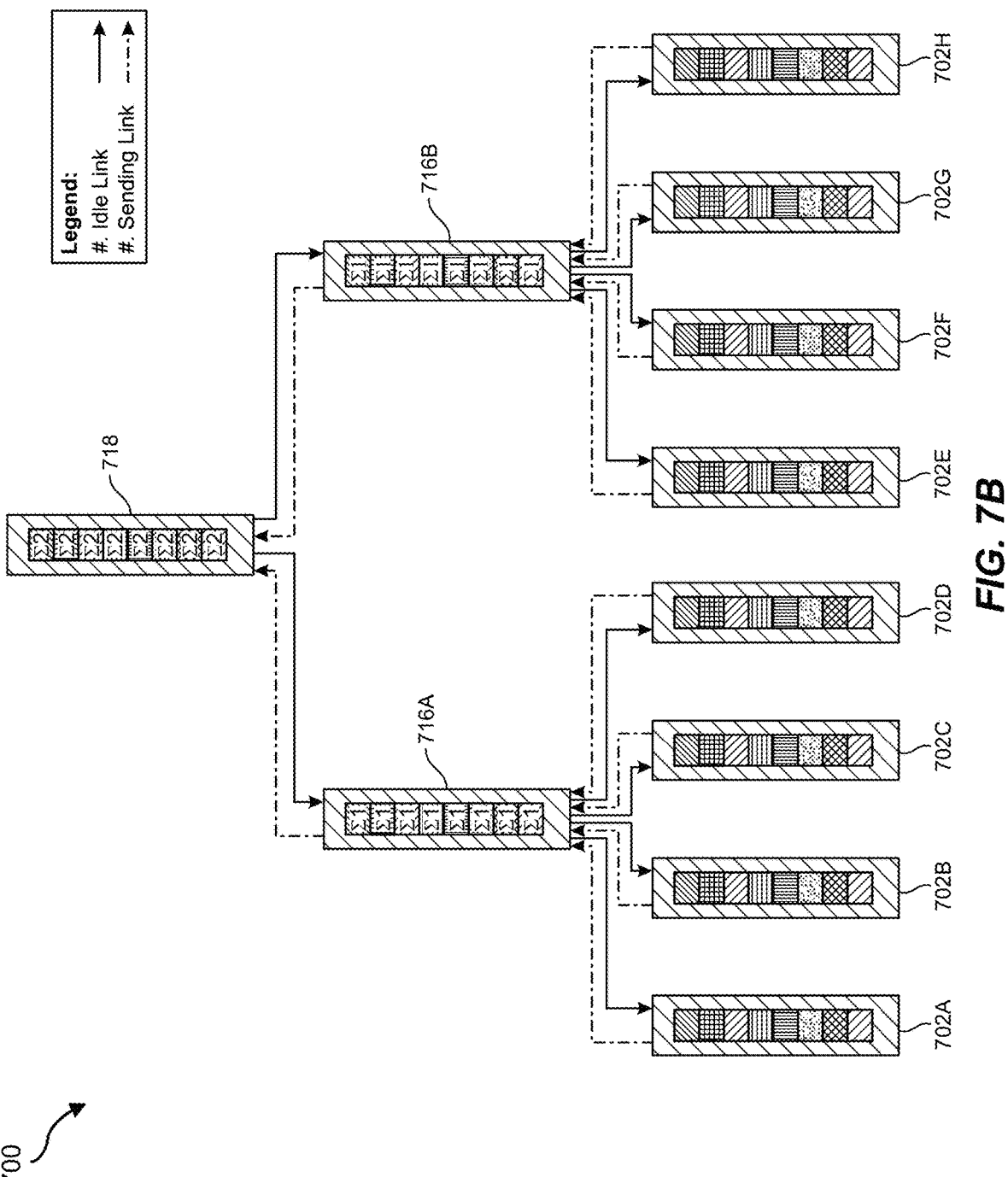
FIG. 7B is a network topology diagram of an intermediate phase of an allreduce operation.
Figure 7C:
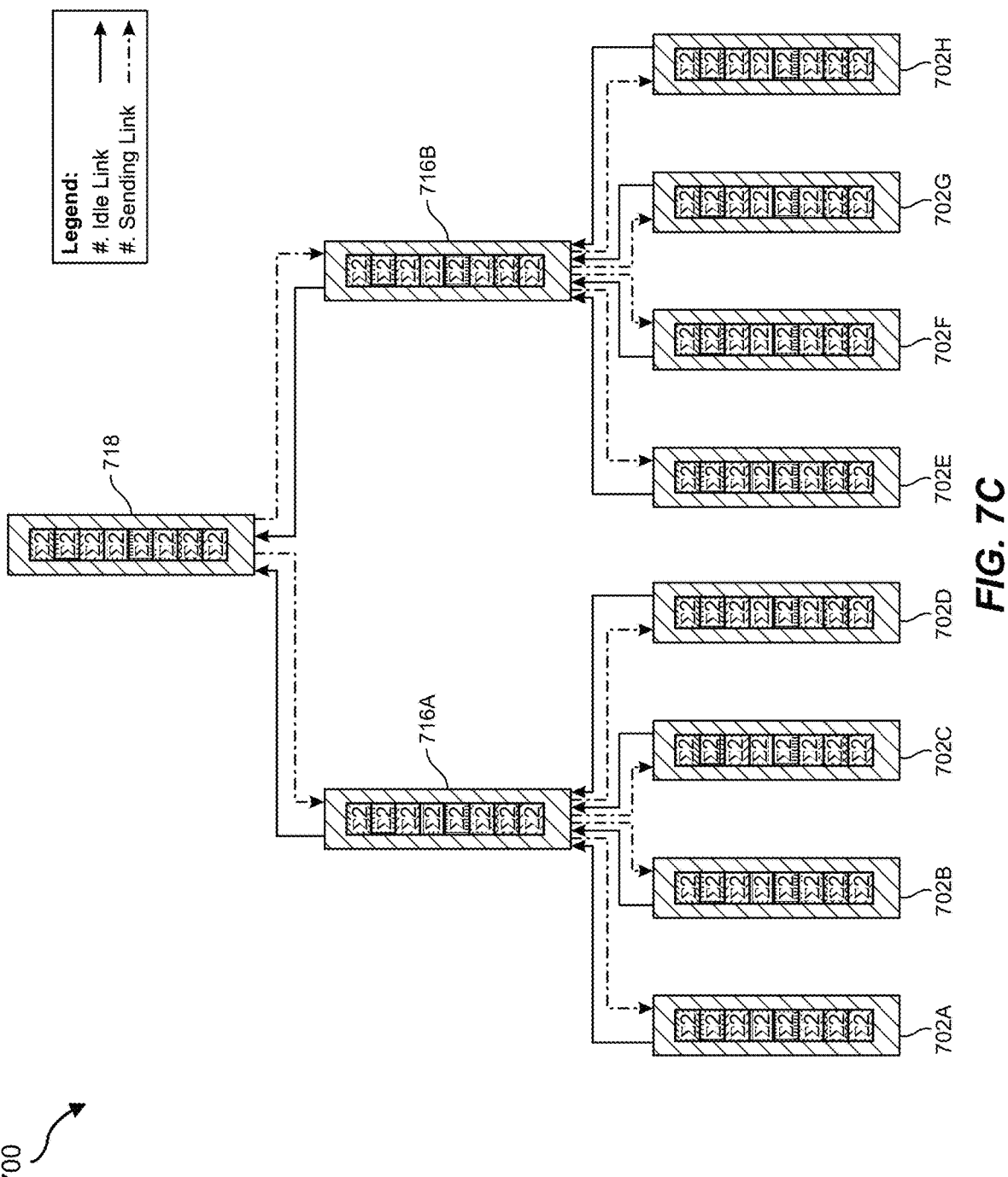
FIG. 7C is a network topology diagram of a final phase of an allreduce operation.

FIGS. 7A-7C illustrate an example network topology for a collective operation 700 that can correspond to an allreduce operation for a process 702A, a process 702B, a process 702C, a process 702D, a process 702E, a process 702F, a process 702G, and a process 702H. Each of processes 702A-702H can correspond to a process (e.g., one or more iterations of process 122A and/or process 122B) running on one or more nodes (e.g., one or more iterations of computing device 102A and/or computing device 102B respectively) in an interconnect network (e.g., collective network 100). FIGS. 7A-7C further illustrate a node 716A, a node 716B, and a node 718, each corresponding to nodes (e.g., one or more iterations of computing device 102A and/or computing device 102B) as described herein, that can be used to sending intermediary data to/from processes 702A-702H.

For an allreduce operation, the various processes (e.g., processes 702A-702H) can hold data (e.g., a full vector each, as illustrated in FIG. 7A) to be reduced. Processes 702A-702H can be organized such that half of the processes can be linked to corresponding nodes. More specifically, as illustrated in FIGS. 7A-7C, processes 702A-702D can be linked to node 716A, and processes 702E-702H can be linked to node 716B. Further, nodes 716A-716B can be linked to node 718, forming a tree topology as illustrated in FIGS. 7A-7C, although in other examples, other topologies can be used, which can further depend on the collective operation to be performed.

In addition, FIGS. 7A-7C illustrate downstream links (e.g., links going away from processes 702A-702H) and upstream links (e.g., opposite the downstream links and going towards processes 702A-702H). FIGS. 7A-7C illustrate the downstream links mirroring the upstream links (e.g., each downstream link having a reverse as the corresponding upstream link), although in other examples, such as for other collective operations, the downstream and upstream links can vary.

FIG. 7A corresponds to a start of the allreduce operation (e.g., corresponding to phase 604 in FIG. 6) wherein each of processes 702A-702H has its own set/vector of data. FIGS. 7A-7C illustrate each index of the data vector with a different pattern. As further illustrated in FIG. 7A, each of the links are idle (indicated by solid lines).

The allreduce operation involves each process providing its data, reducing the data across the various data sets of the processes, and propagating the results to every process, as described herein. The topology illustrated in FIGS. 7A-7C illustrate an example of how the various processes can coordinate the sending and processing of data. In FIG. 7B, each process sends its data (using sending links indicated by dotted and dashed lines) downstream to its corresponding node for processing. For example, processes 702A-702D each send their data to node 716A and processes 702E-702H send their data to node 716B.

The intermediary nodes can perform the reduction (represented by 21 in FIG. 7B) on the received data sets/vectors, which are subsets of the total data. Specifically in FIG. 7B, node 716A reduces half of the total data, as received from processes 702A-702D, and node 716B reduces the other half of the total data, as received from processes 702E-702H.

After reducing the received data vectors, each of nodes 716A and 716B provide their intermediate results downstream to node 718 for further processing. Specifically, node 718 reduces the two halves of the total data received from nodes 716A and 716B to produce a final result (represented by Σ2) corresponding to the reduction performed across all the data vectors from processes 702A-702H.

Turning to FIG. 7C, node 718 propagates the results to each of processes 702A-702H via nodes 716A-716B. More specifically, as illustrated in FIG. 7C, based on the topology, node 718 sends the results upstream to nodes 716A and 716B (via sending links indicated by dotted and dashed lines). Each of nodes 716A and 716B can send the results upstream to processes 702A-702H, node 716A sending the results to processes 702A-702D and node 716B sending the results to processes 702E-702H. Accordingly, processes 702A-702H each have the final result of the reduction (e.g., corresponding to phase 606 in FIG. 6).

For the various collective operations described herein, data is passed and operated on interleaving nodes and links between processes. The collective engine (e.g., control circuit 112) can establish the network or routing topology, which in some examples can be different for each collective operation, and further improve its performance with the systems and methods described herein. As detailed above, for an allreduce operation, the network topology can impact performance. The collective engine provided herein can establish, for instance when initializing the collective network, an appropriate network topology, further establishing routes between nodes.

To improve performance, the collective engine can optimize aspects of the network topology. For example, the collective engine can calculate communication costs (e.g., latency associated with sending data between nodes) for different network topologies to determine an optimal topology using cost model parameters. FIG. 8 illustrates a table 800 of example communication cost models for calculating communication cost time T for various topologies, such as binary tree (e.g., FIGS. 7A-7C), recursive doubling, ring, and in-network (see, e.g., FIGS. 9A-9G illustrating an in-network with multiple links between layers/levels of nodes as will be described further below). The cost models herein can be represented by cost functions having parameters, which can further be implemented as instructions performed by any device/system described herein, such as the collective engine. For the cost model parameters in FIG. 8, $\alpha$ is a latency (e.g., a per-GPU network latency in time such as seconds), p is a number of GPUs in the collective communication operation, $\beta$ is an inverse bandwidth (e.g., 1/per-interconnect-network-bandwidth in bits/second), and $\varepsilon$ is an up-down ratio (e.g., per network switch, a ratio of downstream to upstream ports such as downstream/upstream), and n is a vector size (e.g., a size in bytes of a vector to be reduced).

In some implementations, the collective engine can optimize the topology using, for example, the cost models of different topology types in FIG. 8. For instance, optimizing the topology can correspond to optimizing (e.g., minimizing or otherwise reducing) a communication cost, as calculated from the cost models. In some examples, optimizing the cost can include using different cost models (e.g., corresponding to different topology types) for different levels of the topology. In some examples, optimizing the cost can include optimizing topology structures, such as flattening trees (e.g., simplifying a tree structure by, for instance, rearranging leaf nodes and/or descendent nodes to a similar level as a corresponding parent node), rearranging nodes/links, etc. For example, the collective engine can use an optimizer function (e.g., statistical and/or other mathematical analysis for one or more parameters, which can be implemented with instructions, a machine learning model, etc.). Accordingly, the collective engine can optimize the communication cost for the collective operation by evaluating multiple communication models (e.g., as illustrated in FIG. 8), select the cost model corresponding to the optimized communication cost (e.g., corresponding to a feasible minimum cost value calculated from the cost models), and configure the topology for performing the collective operation using the selected cost model.

In some implementations, the cost models can be used for building the topology itself such as by using values for cost model parameters (e.g., as used for optimizing the communication cost) as topology parameters. For instance, the cost model parameter of $(\log_e(p))$ can relate to a number of layers (e.g., tree depth) for an in-network topology. The collective engine can then build out the topology (e.g., when initializing the collective network which can include configuring nodes of the collective network) by establishing appropriate links (e.g., communication connections) between the layers (e.g., nodes of neighboring layers), for example using a heuristic following topology parameters (which can use values of cost model parameters corresponding to the optimized cost) such as the number of downstream and upstream ports, a stride value (e.g., a number of devices connected round-robin style to nodes of the next layer), a number of processors (e.g., a processor and/or other device capable of processing data), a number ports per processor (e.g., input/upstream ports and/or output/downstream ports), a tree depth (e.g., a number of layers), etc., as will be discussed further below with respect to an example in-network topology in FIGS. 9A-9G.

Although the present disclosure discusses optimizing a network topology for an allreduce operation, in other implementations the systems and methods described herein can be applied to other collective operations. In addition, in some implementations the network topology can include portions that are optimized using different cost models such that the overall network topology can include portions of different topologies (e.g., a combination of different topology types).

The collective engine (e.g., control circuit 112) can also establish communication routes for the network topology. For example, FIGS. 9A-9G illustrate an example in-network topology 900 for an in-network allreduce operation, which in some examples is based on the network topology optimization described herein. The collective engine can include a network resource scheduler or aggregation manager that schedules resources of the network capable of doing collective offload operations and/or portions thereof. In some implementations, the network resource scheduler can reside in a node (e.g., GPU) and/or in a separate device connected to the network. The network resource scheduler can set up flows that orchestrate and prioritize particular links/switches. In some implementations, the network resource scheduler can request a state (e.g., metadata and/or other information about current conditions of a node) from each node in the collective network to initialize the collective network for a collective operation. For example, if a resource (e.g., node) indicates it is ready (e.g., when initializing the collective network), the resource sends its state (e.g., as a message) that can include a readiness status message with a job profile (e.g., metadata which can indicate, for example, processing capacity, memory capacity, types of processing/operations preferred for the node, location in topology, other preferences/limitations, etc.) to the network resource scheduler to establish flows/paths according to readiness and job profile. More specifically, the network resource scheduler can establish a topology of data routes for the collective operation, which can include identifying processing needed for each level of the collective network to perform the collective operation, and identifying destination nodes of each level capable of processing data as needed for the collection operation (e.g., as further determined from the job profile and/or readiness status), and establishing links therebetween. In addition, if a route is blocked (e.g., node is down or otherwise unavailable) the network resource scheduler can accordingly establish different routes, for instance by prioritizing links between available nodes of levels.

A deadlock, in some examples, refers to a scenario when a link to a node sends two packets to the node but the node has only one available buffer such that one of the packets will not be received. In the context of collective operations, because the various nodes rely on the results provided by other nodes and operate in parallel, a deadlock scenario can significantly impact an operation and its performance. The network resource scheduler can establish routes to prevent deadlock.

In some examples, the network resource scheduler can enforce the routes. For instance, the network resource scheduler can use segment routing, in which route/path information travels with a packet such that a node can forward the packet to a destination based on the route information. In some implementations, a header of the packet can include the route information. Thus, a given node can be prevented from arbitrarily selecting a free link to send a packet or otherwise send the packet to a link that is inconsistent with the established routes.

By establishing routes, certain packets of data can be routed to particular nodes as needed for the collective operation. Further, in some examples, the network resource scheduler can dynamically update or otherwise reestablish the topology, for instance in response to changes of node availabilities (e.g., in response to changes of states of nodes). Additionally, the routes allow for data to be chunked (e.g., split into smaller segments) and routed to the appropriate nodes for reductions with other corresponding nodes.

The network resource scheduler (e.g., which can be part of a collective engine such as control circuit 112) provides routes that can ensure that data reaches specific nodes. The data can be chunked (e.g., split) into smaller segments (e.g., chunks corresponding to portions of an original message size, such as a subvector of a vector) to improve bandwidth and performance. In some implementations, a chunking scheme can be based on network topology which can be optimized as described herein. The topology can ensure that corresponding chunks (e.g., chunks that should be processed together) reach a same destination as needed to perform the collective operation, as will be described further below. In one implementation, the chunking scheme can be based on similar factors as used for network topology optimization, such as a number of ports. For example, each node that performs a collection operation or portion thereof on data (which in some examples is received via input ports from nodes of a prior level of the collective network) can chunk its resulting data into a number of chunks equal to a number of downstream (e.g., output) ports and send the chunks through respective ports of the downstream ports (e.g., to nodes of a subsequent level of the collective network), although in other examples, other chunking schemes can be used.

FIGS. 9A-9G illustrate an example routing (e.g., preventing deadlock) and chunking for an example in-network topology 900 for an allreduce operation. FIGS. 9A-9G illustrate various servers (e.g., corresponding to instances of server 202), GPUs (e.g., corresponding to instances of GPU 214A and/or GPU 214B which can further correspond to processes), switches (e.g., corresponding to instances of switch 218), NICs (e.g., instances of NIC 216A and/or NIC 216B, and other nodes (e.g., corresponding to instances of any node described herein). In-network topology 900 illustrates certain how topology parameters such as a number of downstream ports (e.g., ports for connecting to downstream nodes), a number of upstream ports (e.g., ports for connecting to upstream nodes), and/or a stride value can be used to build a topology (which in some examples can use different values at different levels). The number of downstream ports can correspond to a number of links going downstream from a node, and the number of upstream ports can correspond to a number of links going upstream from the node. The stride value can correspond to, for links of nodes of a given level, how many links can be connected to different nodes of a next level before repeating nodes. In other words, the stride value can correspond to how many nodes of the next level that a set of nodes of a given level can connect to.

In-network topology 900 illustrates, for example, the GPU level having two downstream ports per node (and no upstream ports as the GPU level can correspond to a root level). Having two downstream ports, each GPU can be connected to two different switches of the next level (e.g., the switch level), further matching the stride value. At the switch level, each switch has two upstream ports (mirroring the downstream links of the GPUs) and two downstream ports (connecting to two different NICs). At the NIC level, each NIC has one upstream port (mirroring the downstream links of the switches) and one downstream port (e.g., corresponding to forwarding data). In some examples, the interconnected GPU to NIC levels can correspond to a single machine (e.g., server_0 and server_1). The NIC downstream ports can be connected to nodes of the next level based on a stride value of four. As illustrated in FIGS. 9A-9G, each NIC can be successively connected to nodes in order, an repeating the order after reaching the stride value. More specifically, nic_0_0_0, nic_0_1_0, nic_0_0_1, and nic_0_1_1 can be linked to node_0_0_0, node_0_0_1, node_0_0_2, and node_0_0_3, respectively in sequence, and following NICs can repeat linking to the nodes in the sequence, round-robin style. In-network topology 900 further includes additional nodes (e.g., node_0_1_0, node_0_1_1, node_0_1_2, and node_0_1_3) representing how the topology can be extended, and are illustrated with only single upstream/downstream links to simplify the illustration.

As described herein, the collective engine (e.g., control circuit 112), can establish different topologies for different collective operations. In other words, the nodes of in-network topology 900 can also have links not illustrated in FIGS. 9A-9G, and for an allreduce operation, the collective engine can enforce routes in accordance with in-network topology 900, for example using segment routing, destination lists (e.g., associated with ports/links) and/or other routing enforcement. In addition, in some implementations, a topology (e.g., one or more levels) can be further restricted by available links, and/or availability of components (e.g., in-network topology 900 illustrates each server having two GPUs) which can further be related to what components reside in which devices. Moreover, in some implementations, a topology can be based on an availability and/or type of node (e.g., certain nodes being available to process data and certain other nodes being available to forward data).

To better illustrate how data/chunks can be routed through in-network topology 900 and how it can relate to each node, each level is illustrated with a specific indexing notation. For example, the GPU level can be indexed based on server_gpu such that a server index and a GPU index for that server can identify GPUs (e.g., Gpu_0_0 and Gpu_0_1 branching from Server_0 and Gpu_1_0 and Gpu_1_1 branching from Server_1). The switch level can be indexed based on server_switch such that a server index and a switch index for that server can identify switches. The NIC level can be indexed based on server_GPU_NIC such that a server index, corresponding GPU index, and NIC index for that server/GPU can identify NICs. The outer level nodes can be indexed based on pod_layer_node such that a pod of servers (e.g., "0" in FIGS. 9A-9G), layer within the nodes (e.g., "0" for inner layers, "1" for outer layers) and node index can identify nodes (which can correspond to switches or any other nodes as described herein). Additionally, the example data (e.g., chunks) can be indexed by server_GPU_chunk_subchunk such that server index, GPU index, and chunk/subchunk indexes can identify chunks. In some implementations, the indexing described herein can be used for identifying nodes and/or chunks as data is routed through in-network topology 900, although other indexing and/or identification can be used. Moreover, for each level, nodes of the level can send data through specific ports having links for specific destinations as described herein, which can further be enforced via segment routing (e.g., having a destination node and/or port as part of the send data).

Figure 9A:
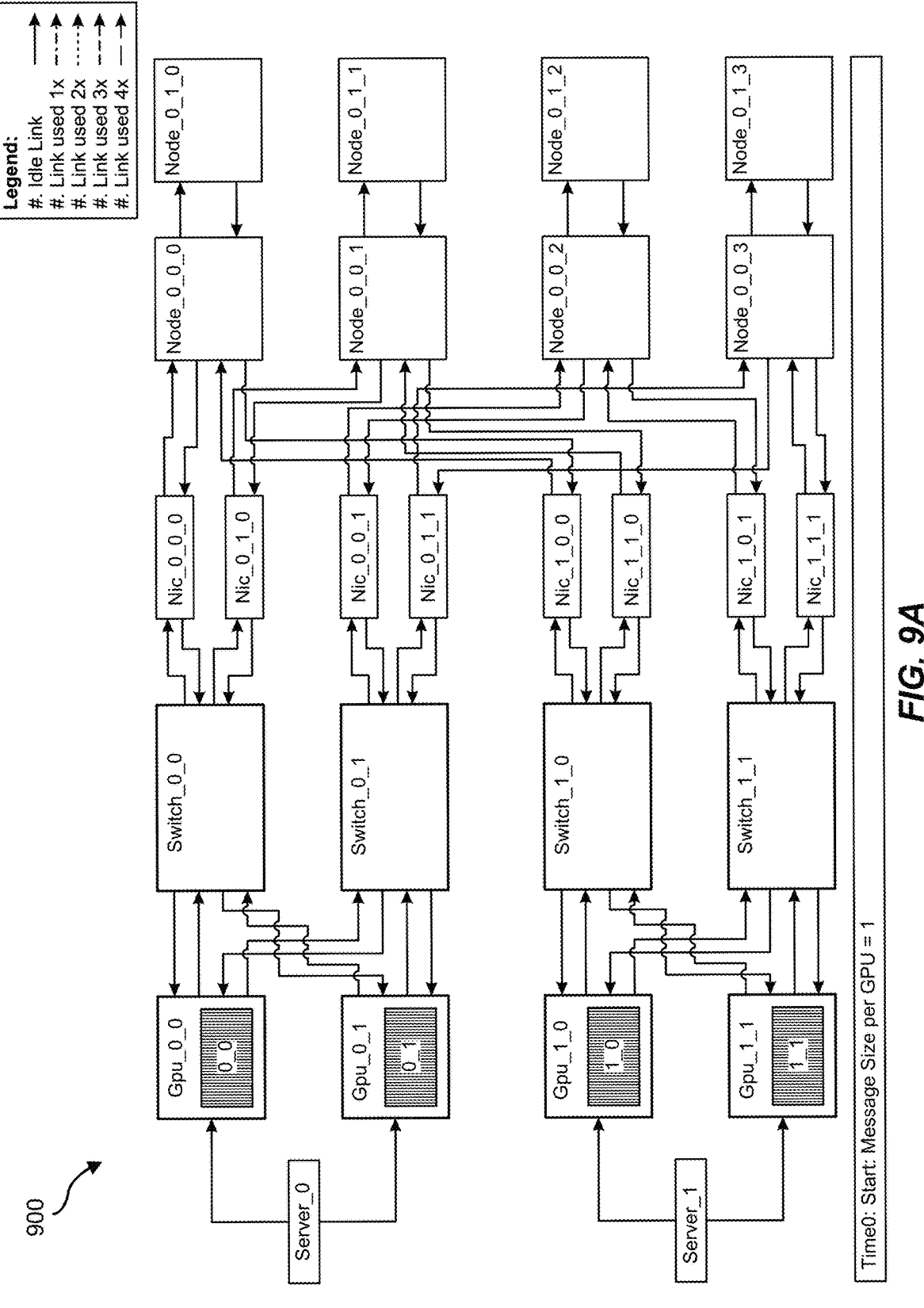
Figure 9B:
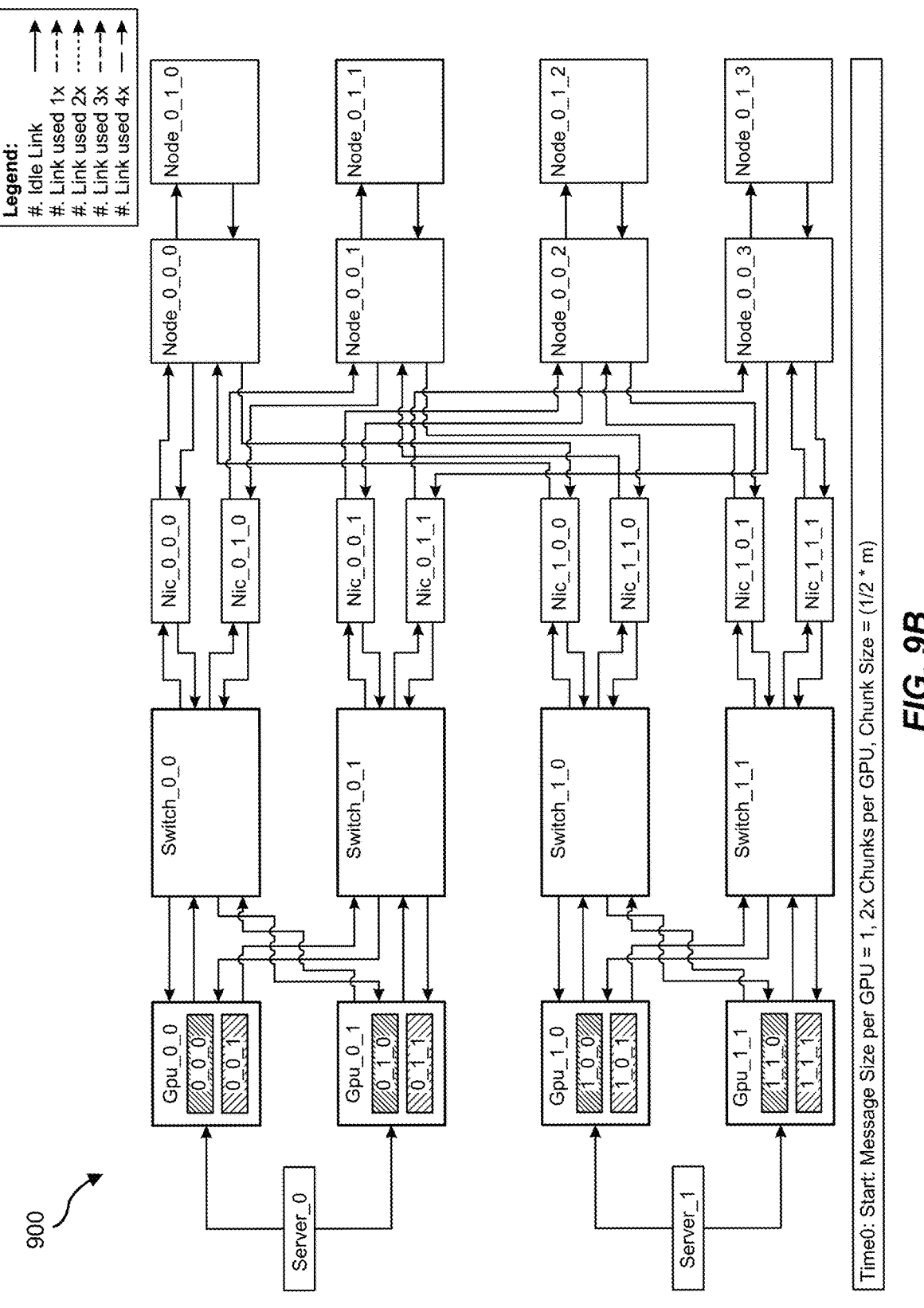

In FIG. 9A (e.g., time 0 with respect to sending/chunking data), each GPU holds data (e.g., a message) of a full message size (e.g., size=1). Accordingly, each message is indexed similar to its corresponding originating GPU. In FIG. 9B (e.g., also time 0 with respect to sending/chunking data), each GPU can chunk its data according to a chunking scheme, which in some examples corresponds to dividing a data vector equal sized chunks (e.g., subvectors from the original vector) for each downstream port. In some examples, the subvectors can be defined based on vector indexes, such as a lower half of vector indexes and an upper half of vector indexes, odd and even vector indexes, etc. to produce appropriately sized subvectors. As will be described further below, by applying consistent chunking to vectors, and enforcing routing, data elements of the original vector can be reduced with corresponding data elements of the same vector index from other data vectors (e.g., the data vectors across the nodes).

Thus, each GPU having two downstream ports, can chunk its data into two similarly-sized chunks (e.g., chunk size=½ of message size) for sending one chunk per port. In FIG. 9B, each half of the message can be indexed as "0" and "1" as illustrated (e.g., message 0_0 chunked into chunk 0_0_0 and chunk 0_0_1, message 0_1 chunked into chunk 0_1_0 and chunk 0_1_1, and so forth). By applying the chunking scheme across the GPUs, each corresponding chunk half/index can contain the same vector indexes (e.g., all chunks ending in "0" can correspond to the same vector indexes as from the original message). At time 0, all of the links are idle, as illustrated in FIGS. 9A and 9B.

Figure 9C:
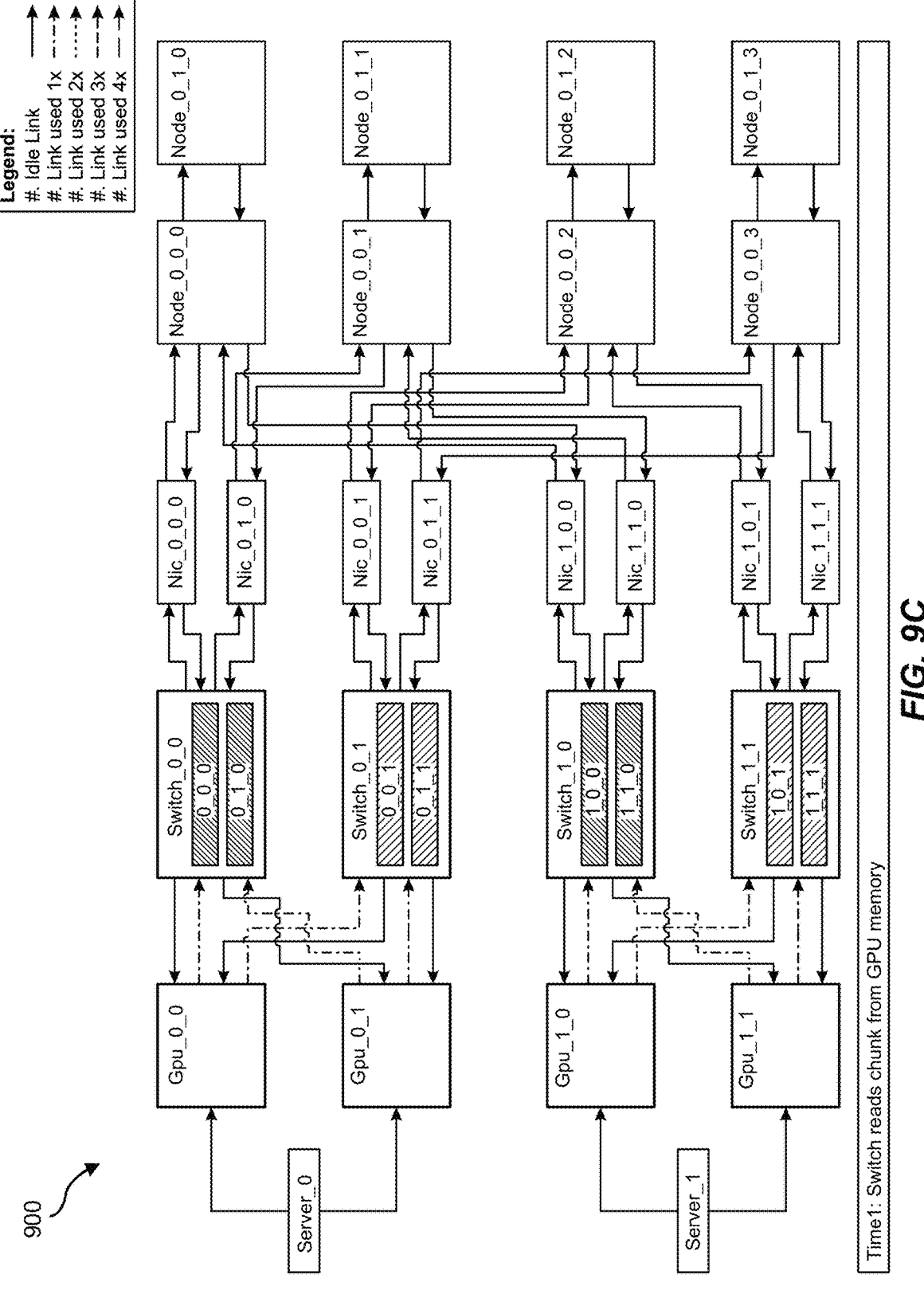

In FIG. 9C (e.g., time 1), the chunks from the GPUs are routed to switches such that corresponding halves reach the same switches such that the first switch has the first halves of the original message, and the second switch has the second halves of the original message (e.g., switch_0_0 having chunk 0_0_0 and chunk 0_1_0 whereas switch_0_1 has chunk 0_0_1 and chunk 0_1_1, and so forth). As illustrated in FIG. 9C, the links corresponding to the downstream ports have been used once. In some implementations, the switches can read data from GPU memory although in other implementations data can be propagated as needed. As will be described further below, the described chunking scheme can guarantee that corresponding chunks arrive at the same destination to allow reduction (e.g., that values of a given vector index of the original message are reduced with other values of the same vector index from other messages).

Figure 9D:
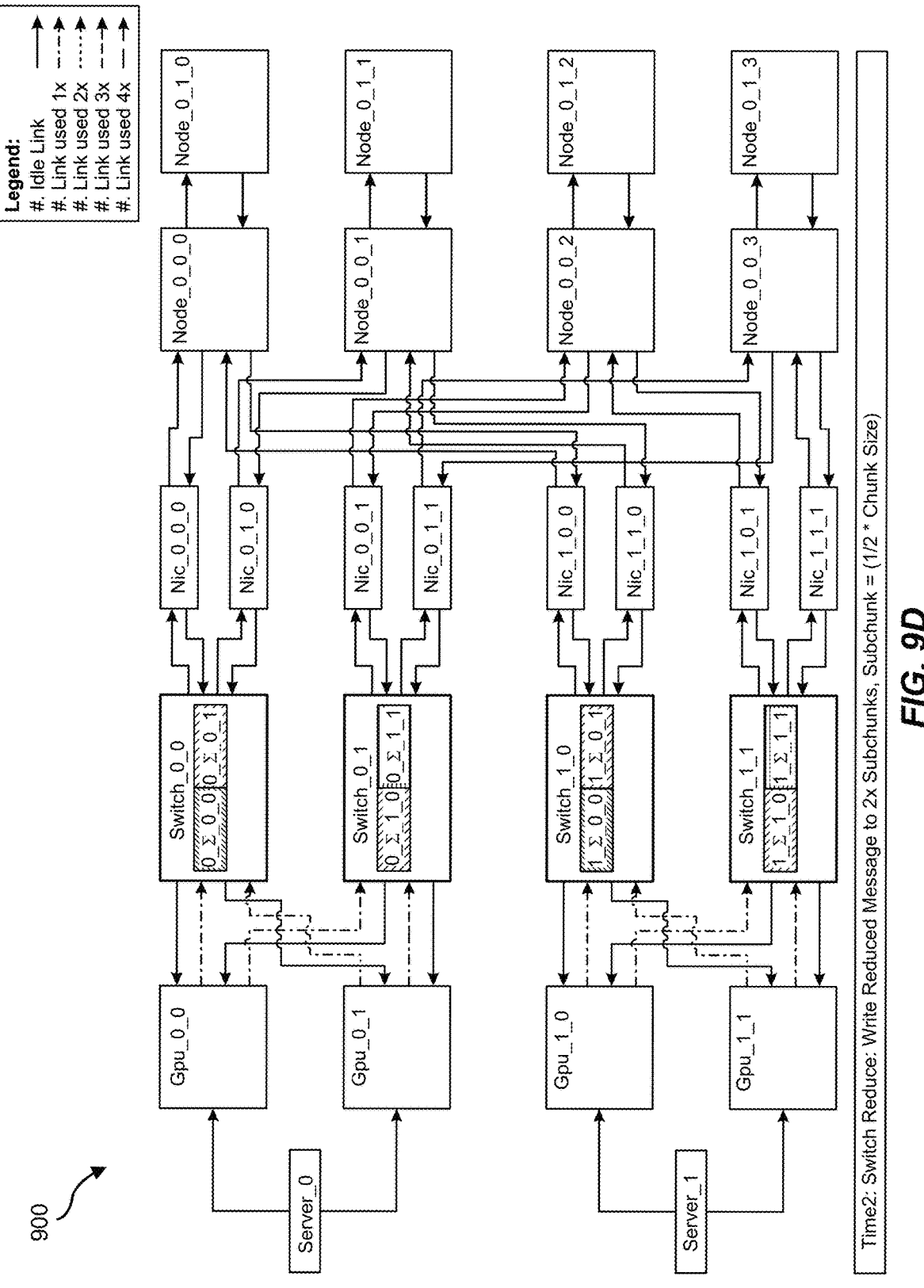

In FIG. 9D (e.g., time 2), the switches reduce the data (e.g., performing a reduction operation using the two received chunks) producing in a single chunk-sized result. The result is chunked again in accordance with the chunking scheme, for example into two similarly-sized subchunks (e.g., subchunk size=½ chunk size) corresponding to two downstream ports. For example, the result for switch_0_0 is divided into subchunk 0_2_0_0 and subchunk 0_2_0_1. For the purposes of illustrating how chunks are reduced and routed, the subchunk indexes indicate that Gpu_0_0 and Gpu_0_1 have been reduced ("0_Σ" which in other words corresponds to the same vector indexes from message 0_0 and message 0_1 have been reduced and more specifically indicates that data from the two GPUs of a server have been reduced) for the given chunk index (e.g., the following "0" corresponding to chunk 0_0_0 and chunk 0_1_0) which are now split into two subchunks "0" and "1" (e.g., at the ends of the subchunk indexes). As described herein, the subchunks can be divided based on vector index values. By applying the chunking scheme across the switches, each corresponding subchunk half/index can contain the same vector indexes (e.g., all subchunks ending in "0_0" can correspond to the same vector indexes as from the original message and more specifically "0_x" corresponding to the same half of vector indexes from the original message and "x_0" corresponding to the same half of vector indexes from the first chunking).

Figure 9E:
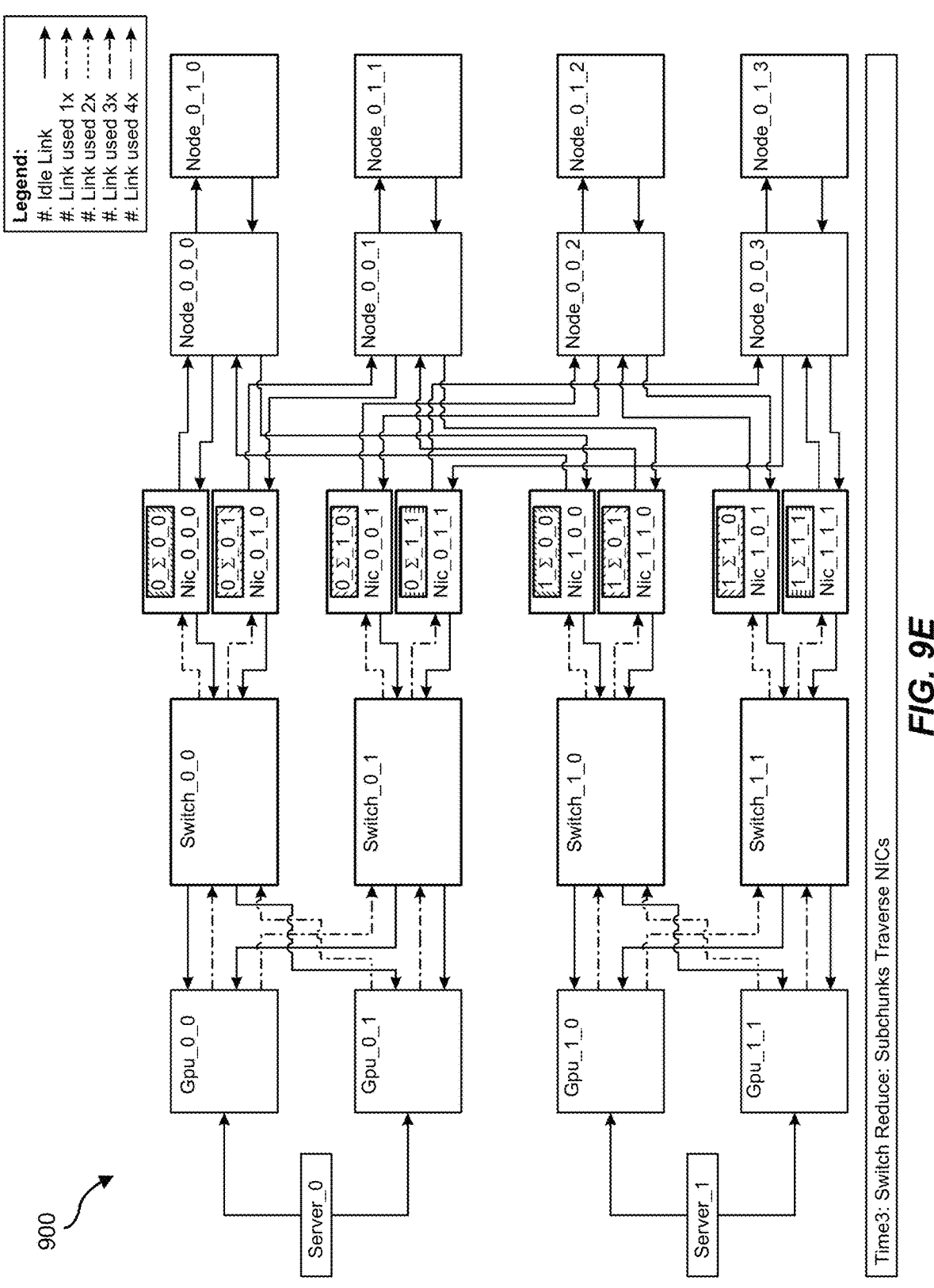
Figure 9F:
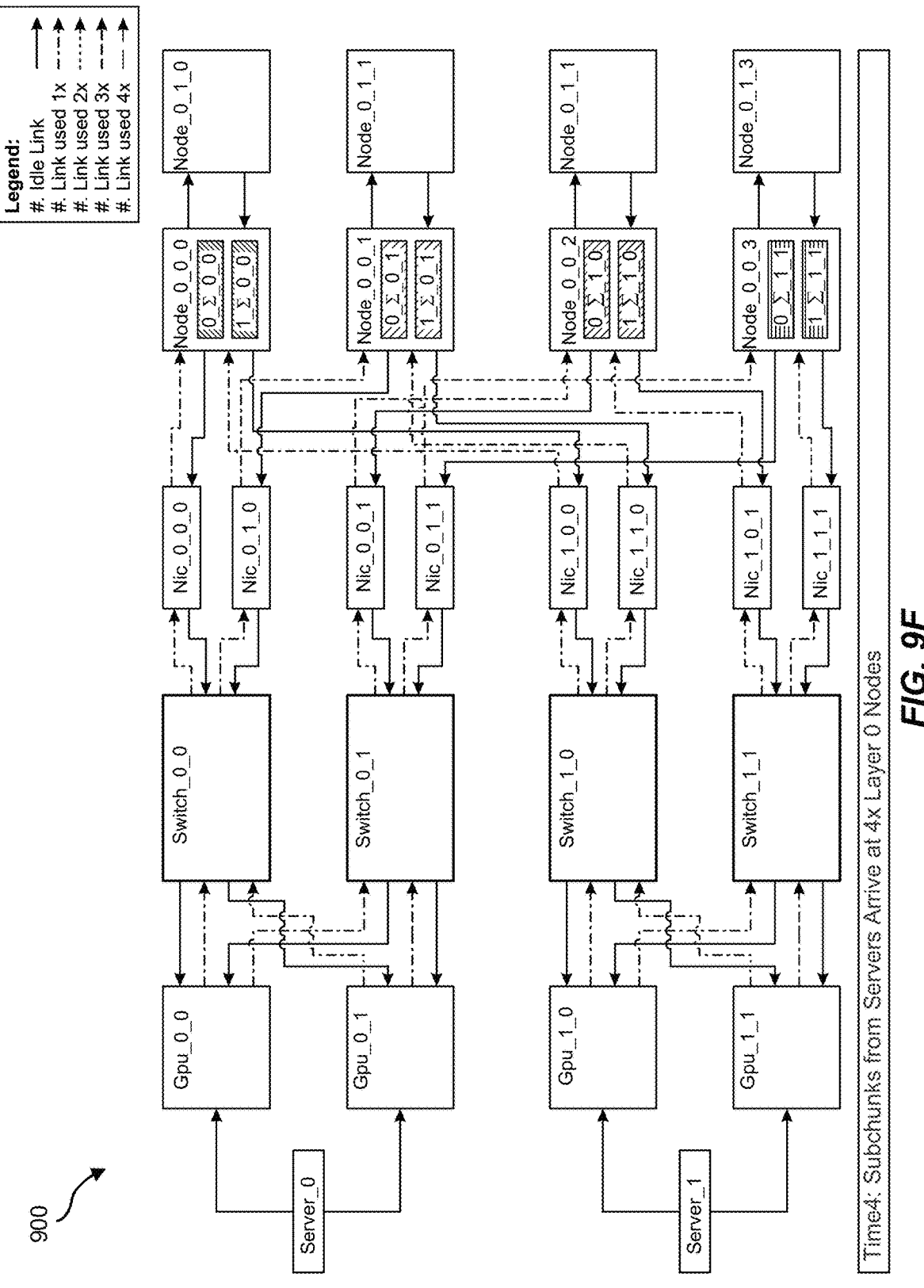

In FIG. 9E (e.g., time 3), the subchunks are sent from the switches downstream to NICs based on the route as illustrated. Because the NICs do not operate on the data, the subchunks traverse the NICs and are forwarded to nodes (e.g., layer 0 nodes) as illustrated in FIG. 9F (e.g., time 4). Due to the routing, the appropriate corresponding chunks are forwarded to the same nodes such that reduction is possible. For example, by using the stride value as described above, nic_0_0_0 can send subchunk 0_2_0_0 to node_0_0_0, and nic_1_0_0 can send subchunk 1_2_0_0 to node_0_0_0. Node_0_0_0 therefor has the same vector indexes of subchunks (as indicated by common ending "0_0" as described above), such that node_0_0_0 can reduce its data, and so forth with the other nodes. Moreover, as described above, the leading "0" or "1" in the subchunk indexes indicate the originating server, such that node_0_0_0 can reduce the same vector indexes of subchunks of data from the two servers, and so forth with the other nodes. As a result, each of the four nodes has a subchunk (e.g., ¼ of the message size) of data reduced from each of the original GPUs.

Figure 9G:
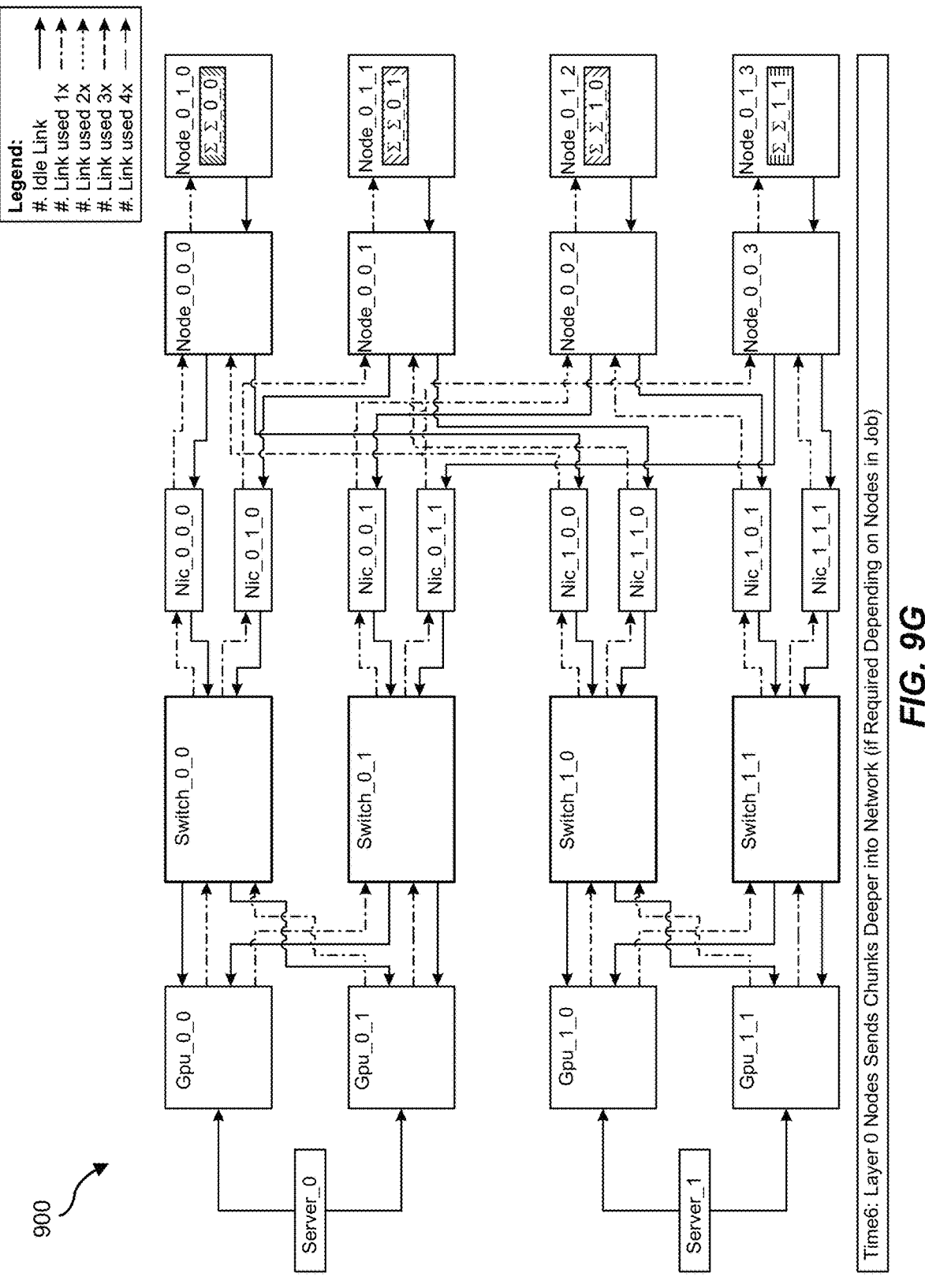

After the layer 0 nodes reduce the data, in FIG. 9G (e.g., time 6) the resulting subchunks can be sent deeper into the network, represented by the layer 1 nodes, as needed. Although not illustrated in FIG. 9G, the subchunks can be chunked into smaller chunks and sent deeper into the network (e.g., having a topology appropriate for the additional chunking) if needed.

As illustrated in FIG. 9G, the subchunks are indexed with leading "Σ_Σ," indicating that both servers and both GPUs' subchunks have been reduced, and trailing "0_0," "0_1," "1_0," and "1_1" corresponding to the vector indexes that been split into four subchunks. Thus, these four subchunks, if rebuilt into a single message, represent the reduction of the original messages (e.g., a result of the reduction). To distribute the result back to the GPUs (see, e.g., FIGS. 6 and 7C) the subchunks can be forwarded back through in-network topology 900 via the upload links (e.g., reversing the route and chunking illustrated in FIGS. 9A-9G without further processing/reduction).

Thus, by establishing a topology having a given level chunk its data and distribute chunks, round-robin style, to a next level having a number of nodes corresponding to number of chunks (e.g., the GPU level chunking data into two chunks for sending to the switch level having two switches, and from the switch level further chunking data into four subchunks for sending, via the NIC level, to four nodes of the node level), the topology allows more efficient processing of smaller data sets (e.g., at the switch level and node layer 0 reducing chunks or subchunks, respectively). This topology can further improve bandwidth efficiency. For instance, the topology itself can be optimized based on a cost model as described above. Further, the chunking allows smaller data sets to be communicated, and further avoids having a node hold the result, and distribute the full result back to the processes.

Although FIGS. 9A-9G illustrate how chunked data can be sent via routing that can prevent deadlock, in other examples data can be sent through in-network topology 900 via similar routes without chunking the data. Additionally, although the examples described herein generally follow data moving downstream until reaching root nodes, and reversing upstream (e.g., in one direction at a time), in other examples, the routing can include downstream and upstream movement (e.g., in both directions) as needed. For example, certain nodes can be unavailable for receiving and/or sending data (e.g., does not have the storage and/or operational capacity) such that the routing can include reversing into layers, skipping over layers, etc. Moreover, FIGS. 9A-9G illustrate a simplified example of a pod of two servers. In other examples, the topology building, routing, and/or chunking described herein can be to greater and/or fewer pods of greater and/or fewer servers and/or other devices.

Figure 10:
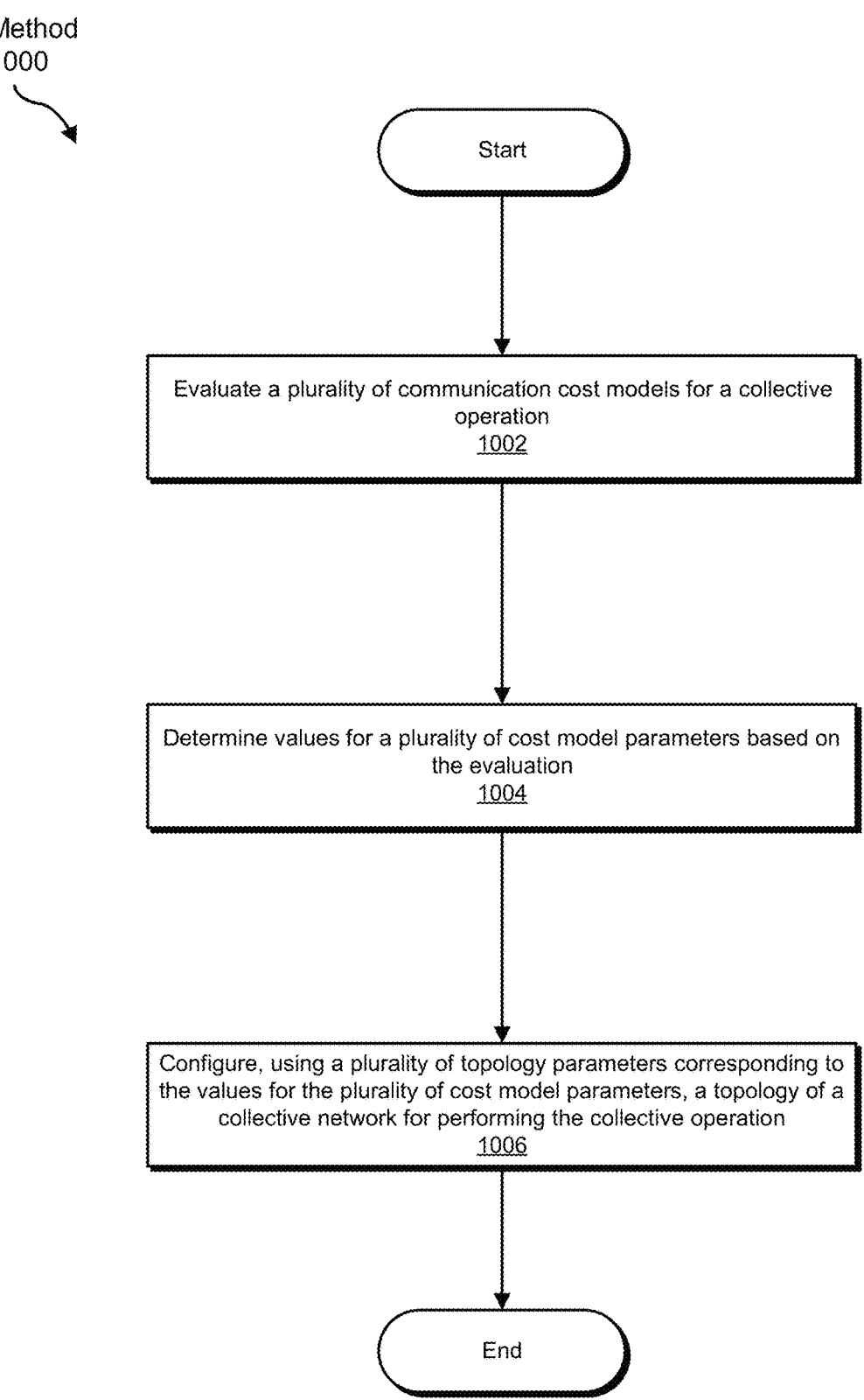
FIG. 10 is a flow diagram of an exemplary method for network collective offload cost management.

FIG. 10 is a flow diagram of an exemplary computer-implemented method 1000 for network collective offload routing management. The steps shown in FIG. 10 can be performed by any suitable computer-executable code and/or computing system, including the system(s) illustrated in FIGS. 1, 2, 7A-7C, and/or 9A-9G. In one example, each of the steps shown in FIG. 10 represent an algorithm whose structure includes and/or is represented by multiple sub-steps, examples of which will be provided in greater detail below.

As illustrated in FIG. 10, at step 1002 one or more of the systems described herein evaluate a plurality of communication cost models for a collective operation. For example, control circuit 112 can evaluate multiple communication cost models for a collective operation (e.g., FIG. 8 for the allreduce operation).

The systems described herein can perform step 1002 in a variety of ways. In one example, evaluating the plurality of communication cost models can include optimizing a communication cost of the collective operation and the values for the plurality of cost model parameters are determined based on the optimized communication cost. As described above, control circuit 112 can use an optimizer function (e.g., circuit and/or instructions for evaluating and optimizing a cost function) on the cost models (e.g., having cost functions) to determine values for the cost model parameters for the optimized communication cost. As further described herein, in some examples the optimization can include using portions of different cost models in a piecewise fashion (e.g., using certain cost models with respect to certain levels/nodes of the collective network).

At step 1004 one or more of the systems described herein determine values for a plurality of cost model parameters based on the evaluation. For example, control circuit 112 can determine values for the cost model parameters based on the evaluation.

At step 1006 one or more of the systems described herein configure, using a plurality of topology parameters corresponding to the values for the plurality of cost model parameters, a topology of a collective network for performing the collective operation. For example, control circuit 112 can configure the nodes in accordance with a topology using topology parameters determined from the cost model parameters.

The systems described herein can perform step 1006 in a variety of ways. In one example, the values of the cost model parameters can be used as values for corresponding topology parameters for building the topology. For instance, values for cost model parameters such as a number of upstream ports, a number of downstream ports, a number of processors (e.g., nodes having a job profile that matches processing needs), a number of ports per processor, a tree depth, and/or a stride value that produce the optimized communication cost can accordingly be used as values for topology parameters (e.g., building the topology using similar values). FIGS. 9A-9G illustrate an example of a topology using topology parameters as described above.

In some examples, configuring the topology includes configuring communication connections between nodes of a level of the collective network with nodes of neighboring levels of the collective network based on the plurality of topology parameters. For example, control circuit 112 can establish links (e.g., upstream and downstream links on respective upstream and downstream ports) between nodes of the various levels, such as the GPU level with the switch level, the switch level with the NIC level, and so forth in FIGS. 9A-9G.

In some examples, control circuit 112 can configure a portion of the topology based on the plurality of topology parameters and configure a second portion of the topology based on a second communication cost model. For instance, FIGS. 9A-9G illustrate how certain levels can be configured differently (e.g., the NIC level, which can be further based on availability of ports, and/or the node levels which can be configured as needed based on node availability and/or collective operation processing needs). Moreover, control circuit 112 can further configure and/or reconfigure (e.g., dynamically) the topology based on any other factor described herein for establishing the topology.

FIG. 11 is a flow diagram of an exemplary computer-implemented method 1100 for network collective offloading message chunking management. The steps shown in FIG. 11 can be performed by any suitable computer-executable code and/or computing system, including the system(s) illustrated in FIGS. 1, 2, 7A-7C, and/or 9A-9G. In one example, each of the steps shown in FIG. 11 represent an algorithm whose structure includes and/or is represented by multiple sub-steps, examples of which will be provided in greater detail below.

As illustrated in FIG. 11, at step 1102 one or more of the systems described herein receive a plurality of datasets. For example, a node such as computing device 102A or computing device 102B (e.g., corresponding switch_0_0 in FIG. 9C or any other node/process described herein) can receive multiple datasets (e.g., message chunks).

The systems described herein can perform step 1102 in a variety of ways. In one example, a number of the plurality of datasets corresponds to a number of input ports in accordance with a chunking scheme. For example, in FIG. 9C, switch_0_0 can receive a first chunk (0_0_0) from a first input port (connected to Gpu_0_0) and a second chunk (0_1_0) from a second input port (connected to Gpu_0_1).

At step 1104 one or more of the systems described herein perform a collective operation of a collective network on the plurality of datasets to produce a result dataset. For example, switch_0_0 can perform a collective operation on the received chunks (see, e.g., FIG. 9D).

At step 1106 one or more of the systems described herein split the result dataset into a plurality of chunks. For example, in FIG. 9D, switch_0_0 can split the result into subchunks.

The systems described herein can perform step 1106 in a variety of ways. In one example, a number of the plurality of datasets corresponds to a number of input ports and a number of the plurality of chunks corresponds to a number of a plurality of output ports in accordance with the chunking scheme. For example, in FIG. 9D, switch_0_0 having two downstream ports can split the result into two subchunks, as further described above.

At step 1108 one or more of the systems described herein send the plurality of chunks to a plurality of destinations based on a topology corresponding to the collective operation that defines paths for chunks traversing the collective network such that corresponding chunks reach a same destination. For example, in FIG. 9E switch_0_0 can send subchunk 0_Σ_0_0 to Nic_0_0_0, and subchunk 0_Σ_0_1 to Nic_0_1_0 in accordance with the topology.

The systems described herein can perform step 1108 in a variety of ways. In one example, the topology defines connections between nodes of a collective network based on the collective operation such that the plurality of datasets are received from a prior level of the collective network and the plurality of chunks are sent to a subsequent level of the collective network, which in some implementations can be established by the collective engine (e.g., control circuit 112) as described herein. Moreover, control circuit 112 can further configure and/or reconfigure (e.g., dynamically) the topology based on any other factor described herein for establishing the topology. In some examples, the paths for chunks traversing the collective network ensures that chunks of matching vector indexes reach the same destination for the collective operation (see, e.g., FIGS. 9F-9G as further described above).

FIG. 12 is a flow diagram of an exemplary computer-implemented method 1200 for network collective offload routing and deadlock prevention management. The steps shown in FIG. 12 can be performed by any suitable computer-executable code and/or computing system, including the system(s) illustrated in FIGS. 1, 2, 7A-7C, and/or 9A-9G. In one example, each of the steps shown in FIG. 12 represent an algorithm whose structure includes and/or is represented by multiple sub-steps, examples of which will be provided in greater detail below.

As illustrated in FIG. 12, at step 1202 one or more of the systems described herein receive, from each of a plurality of nodes in a collective network, a job profile and a readiness status with respect to initializing the collective network for a collective operation. For example, control circuit 112 can receive from nodes in the collective network (e.g., one or more iterations of computing devices 102A-102B) a job profile and/or a readiness status.

The systems described herein can perform step 1202 in a variety of ways. In one example, control circuit 112 can, as part of initializing the collective network and more specifically initializing the collective network for the collective operation (e.g., an allreduce operation in FIGS. 9A-9G) can request states (e.g., including the job profile and/or readiness status) from each node in the collective network. In some examples, the job profile corresponds to a processing capacity of the node or a memory capacity of the node. In some examples, the readiness status indicates whether the node is ready to receive, process, and/or send data.

At step 1204 one or more of the systems described herein select, for each level of the collective network, nodes capable of processing the collective operation as needed for the level based on the job profiles and readiness statuses. For example, control circuit 112 can select appropriate nodes for each level of the collective network that can process the collective operation (and/or portions thereof) as needed.

The systems described herein can perform step 1204 in a variety of ways. In one example, control circuit 112 can determine, based on the collective operation, what processing is needed at each approximate level to determine processing needs, and select nodes (e.g., based on job profiles and/or readiness statuses), nodes capable of performing the processing, such as reduction of chunks at the switch level and reduction of subchunks at the node level in FIGS. 9A-9G.

At step 1206 one or more of the systems described herein determine, based on the selected nodes for each level, a topology of data routes for the collective operation. For example, control circuit 112 can determine the topology including data routes (e.g., based on links between nodes).

The systems described herein can perform step 1206 in a variety of ways. In one example, determining the topology comprises determining links to selected nodes of a level to nodes of a prior level and nodes of subsequent level. For example, control circuit 112 can determine, for the allreduce operation, that several levels of reductions are needed (e.g., at the switch level and the node level in FIGS. 9A-9G) and further determine intermediary levels (e.g., the NIC level for forwarding data). In some implementations, control circuit 112 can also further use topology parameters to determine links between ports/nodes (e.g., using a stride value for connecting the NIC level to the node level as described above). Moreover, control circuit 112 can further configure and/or reconfigure (e.g., dynamically) the topology based on any other factor described herein for establishing the topology.

At step 1208 one or more of the systems described herein configure the plurality of nodes based on the determined topology. For example, control circuit 112 configure the iterations of computing devices 102A-102B based on the topology (see, e.g., FIGS. 9A-9G).

The systems described herein can perform step 1208 in a variety of ways. In one example, configuring the plurality of nodes comprises establishing links between selected nodes of each level based on the determined topology. For example, control circuit 112 can instruct the nodes to establish links to appropriate nodes of neighboring levels in accordance with the topology. In some examples, the links can be dynamically established when performing the respective collective operation. For example, with segment routing, each node can forward data to the appropriate node via the appropriate port such that each node can be capable of performing different collective operations by processing/forwarding data in accordance with the topology. In some examples, control circuit 112 can reestablish and/or dynamically change the topology (e.g., links) in response to changes in the collective network, such as changes in readiness statuses and/or job profiles (e.g., processing and/or memory capacities).

In addition, although FIGS. 10, 11, and 12 illustrate various steps, in some examples, one or more of the steps illustrated in FIGS. 10, 11, and/or 12 can be combined, intermixed, and/or repeated. For example, certain steps and/or aspects of method 1000 can be incorporated with certain steps and/or aspects of method 1200 for configuring/establishing topologies, which can further be incorporated with certain steps and/or aspects of method 1100 for chunking and sending data.

As detailed above, the computing devices and systems described and/or illustrated herein broadly represent any type or form of computing device or system capable of executing computer-readable instructions, such as those contained within the modules described herein. In their most basic configuration, these computing device(s) each include at least one memory device and at least one physical processor.

In some examples, the term "memory device" generally refers to any type or form of volatile or non-volatile storage device or medium capable of storing data and/or computer-readable instructions. In one example, a memory device stores, loads, and/or maintains one or more of the modules and/or circuits described herein. Examples of memory devices include, without limitation, Random Access Memory (RAM), Read Only Memory (ROM), flash memory, Hard Disk Drives (HDDs), Solid-State Drives (SSDs), optical disk drives, caches, variations, or combinations of one or more of the same, or any other suitable storage memory.

In some examples, the term "physical processor" generally refers to any type or form of hardware-implemented processing unit capable of interpreting and/or executing computer-readable instructions. In one example, a physical processor accesses and/or modifies one or more modules stored in the above-described memory device. Examples of physical processors include, without limitation, microprocessors, microcontrollers, Central Processing Units (CPUs), Field-Programmable Gate Arrays (FPGAs) that implement softcore processors, Application-Specific Integrated Circuits (ASICs), systems on a chip (SoCs), digital signal processors (DSPs), Neural Network Engines (NNEs), accelerators, graphics processing units (GPUs), portions of one or more of the same, variations or combinations of one or more of the same, or any other suitable physical processor.

Although illustrated as separate elements, the modules described and/or illustrated herein can represent portions of a single module or application. In addition, in certain implementations one or more of these modules can represent one or more software applications or programs that, when executed by a computing device, cause the computing device to perform one or more tasks. For example, one or more of the modules described and/or illustrated herein represent modules stored and configured to run on one or more of the computing devices or systems described and/or illustrated herein. In some implementations, a module can be implemented as a circuit or circuitry. One or more of these modules can also represent all or portions of one or more special-purpose computers configured to perform one or more tasks.

In addition, one or more of the modules described herein transforms data, physical devices, and/or representations of physical devices from one form to another. For example, one or more of the modules recited herein receives one or more data vectors to be transformed, transforms the data, outputs a result of the transformation to send to other modules, uses the result of the transformation to perform collective operations, and stores the result of the transformation to perform collective operations. Additionally, or alternatively, one or more of the modules recited herein can transform a processor, volatile memory, non-volatile memory, and/or any other portion of a physical computing device from one form to another by executing on the computing device, storing data on the computing device, and/or otherwise interacting with the computing device.

In some implementations, the term "computer-readable medium" generally refers to any form of device, carrier, or medium capable of storing or carrying computer-readable instructions. Examples of computer-readable media include, without limitation, transmission-type media, such as carrier waves, and non-transitory-type media, such as magnetic-storage media (e.g., hard disk drives, tape drives, and floppy disks), optical-storage media (e.g., Compact Disks (CDs), Digital Video Disks (DVDs), and BLU-RAY disks), electronic-storage media (e.g., solid-state drives and flash media), and other distribution systems.

The process parameters and sequence of the steps described and/or illustrated herein are given by way of example only and can be varied as desired. For example, while the steps illustrated and/or described herein are shown or discussed in a particular order, these steps do not necessarily need to be performed in the order illustrated or discussed. The various exemplary methods described and/or illustrated herein can also omit one or more of the steps described or illustrated herein or include additional steps in addition to those disclosed.

The preceding description has been provided to enable others skilled in the art to best utilize various aspects of the exemplary implementations disclosed herein. This exemplary description is not intended to be exhaustive or to be limited to any precise form disclosed. Many modifications and variations are possible without departing from the spirit and scope of the present disclosure. The implementations disclosed herein should be considered in all respects illustrative and not restrictive. Reference should be made to the appended claims and their equivalents in determining the scope of the present disclosure.

Unless otherwise noted, the terms "connected to" and "coupled to" (and their derivatives), as used in the specification and claims, are to be construed as permitting both direct and indirect (i.e., via other elements or components) connection. In addition, the terms "a" or "an," as used in the specification and claims, are to be construed as meaning "at least one of." Finally, for ease of use, the terms "including" and "having" (and their derivatives), as used in the specification and claims, are interchangeable with and have the same meaning as the word "comprising."

What is claimed is:

1. A device comprising:
a control circuit configured to:
   select a communication cost model for a collective operation; and
   configure, based on the selected communication cost model, a topology of a collective network for performing the collective operation,
   wherein configuring the topology includes configuring communication connections between nodes of a level of the collective network with nodes of neighboring levels of the collective network based on a plurality of parameters.

2. The device of claim 1, wherein the control circuit is configured to select the communication cost model by:
   optimizing a communication cost of the collective operation by evaluating a plurality of communication cost models for the collective operation; and
   selecting the communication cost model from the plurality of communication cost models corresponding to the optimized communication cost.

3. The device of claim 2, wherein the communication cost model includes optimizing the communication cost includes determining optimized parameters for the plurality of parameters.

4. The device of claim 3, wherein configuring the topology is based on using the optimized parameters as topology parameters.

5. The device of claim 3, wherein the plurality of parameters includes at least one of:
   a number of upstream ports;
   a number of downstream ports;
   a number of processors;
   a number of ports per processor;
   a tree depth; and
   a stride value.

6. The device of claim 5, wherein the plurality of parameters includes at least an optimized stride value that corresponds to a number of nodes connected to in a next level.

7. The device of claim 2, wherein optimizing the communication cost includes flattening a tree associated with the communication cost model.

8. The device of claim 1, wherein the control circuit is further configured to configure a portion of the topology based on the selected communication cost model.

9. The device of claim 8, wherein the control circuit is further configured to configure a second portion of the topology based on a second communication cost model.

10. A system comprising:
a memory;
a processor, and
a control circuit configured to:
   evaluate cost parameters of a communication cost model for a collective operation; and
   configure, based on the cost parameters, a topology of a collective network for performing the collective operation,
   wherein configuring the topology includes configuring communication connections between nodes of a level of the collective network with nodes of neighboring levels of the collective network based on a plurality of topology parameters.

11. The system of claim 10, wherein the control circuit is configured to evaluate the cost parameters of the communication cost model by optimizing a communication cost of the collective operation.

12. The system of claim 11, wherein optimizing the communication cost includes determining optimized parameter values for the cost parameters, and configuring the topology is based on using the optimized parameter values as topology parameters.

13. The system of claim 12, wherein the cost parameters include at least one of:
   a number of upstream ports;
   a number of downstream ports;
   a number of processors;
   a number of ports per processor;
   a tree depth; and
   a stride value.

14. The system of claim 13, wherein the plurality of topology parameters include at least an optimized stride value that corresponds to a number of nodes connected to in a next level.

15. The system of claim 11, wherein optimizing the communication cost includes flattening a tree associated with the communication cost model.

16. The system of claim 10, wherein the control circuit is further configured to configure a portion of the topology based on the evaluated cost parameters of the communication cost model and configuring a second portion of the topology based on a second communication cost model.

17. A method comprising:

evaluating a plurality of communication cost models for a collective operation;

determining values for a plurality of cost model parameters based on the evaluation; and configuring, using a plurality of topology parameters corresponding to the values for the plurality of cost model parameters, a topology of a collective network for performing the collective operation, wherein configuring the topology includes configuring communication connections between nodes of a level of the collective network with nodes of neighboring levels of the collective network based on the plurality of topology parameters.

18. The method of claim 17, wherein evaluating the plurality of communication cost models include optimizing a communication cost of the collective operation and the values for the plurality of cost model parameters are determined based on the optimized communication cost.

19. The method of claim 17, further comprising configuring a portion of the topology based on the plurality of topology parameters and configuring a second portion of the topology based on a second communication cost model.

* * * * *